(12) United States Patent
Kumkar

(10) Patent No.: US 6,563,845 B2
(45) Date of Patent: May 13, 2003

(54) OPTICAL MODULATION DEVICE

(75) Inventor: Malte Kumkar, Schramberg (DE)

(73) Assignee: Haas-Laser GmbH + Co. KG, Schramberg (DE)

(*) Notice: Subject to any disclaimer, the term of this patent is extended or adjusted under 35 U.S.C. 154(b) by 52 days.

(21) Appl. No.: 09/945,328

(22) Filed: Aug. 31, 2001

(65) Prior Publication Data
US 2002/0048075 A1 Apr. 25, 2002

Related U.S. Application Data

(63) Continuation of application No. PCT/EP00/01802, filed on Mar. 2, 2000.

(30) Foreign Application Priority Data
Mar. 3, 1999 (DE) .......................... 199 09 376

(51) Int. Cl.[7] .................................. H01S 3/10
(52) U.S. Cl. ..................... 372/28; 372/13; 372/26; 372/9; 359/205; 359/310
(58) Field of Search ..................... 372/28, 13, 20, 372/269; 359/305, 310

(56) References Cited

U.S. PATENT DOCUMENTS

| | | | | |
|---|---|---|---|---|
| 4,308,506 A | * | 12/1981 | Ellis | 372/13 |
| 4,586,184 A | * | 4/1986 | Hess | 372/28 |
| 4,707,835 A | | 11/1987 | Mocker | |
| 4,736,382 A | * | 4/1988 | O'Meara | 372/28 |
| 4,990,791 A | * | 2/1991 | Nishi | 372/32 |
| 5,105,304 A | * | 4/1992 | Tanaka et al. | 359/287 |
| 5,268,912 A | * | 12/1993 | Tatsuno et al. | 372/13 |
| 5,801,389 A | | 9/1998 | Mizutani et al. | |
| 5,883,734 A | * | 3/1999 | Suzuki et al. | 372/32 |

FOREIGN PATENT DOCUMENTS

| | | |
|---|---|---|
| EP | 0 658 813 | 6/1995 |
| EP | 658813 A1 * | 6/1995 |
| JP | 09281530 * | 11/1997 |

OTHER PUBLICATIONS

*Patent Abstracts of Japan*, vol. 1998, No. 02, Jan. 30, 1998, "Optical Switch", Publication No. 09281530, publication date Oct. 31, 1997 (one page).

* cited by examiner

*Primary Examiner*—Leon Scott, Jr.
(74) *Attorney, Agent, or Firm*—Barry R. Lipsitz

(57) ABSTRACT

The invention relates to an optical modulation device for coupling an entering radiation field (12), with which an incident radiation field (40) is divided into a transmitted branch (40T) and a diffracted branch (40B) by means of a first acousto-optical modulation and a diffracted and a transmitted branch are respectively generated by means of a second acousto-optical modulation so that the transmitted branch (40BUT) resulting from the deflected diffracted branch (40BU) and the diffracted branch (40TUB) resulting from the deflected transmitted branch (40TU) propagate in approximately the same direction and form a first radiation field (46) as a result of essentially constructive interference and, in addition, the transmitted branch (40TUT) resulting from the deflected transmitted branch (40TU) and the diffracted branch (40BUB) resulting from the deflected diffracted branch (40BU) propagate in the same direction and form a second radiation field (48) as a result of essentially destructive interference.

68 Claims, 20 Drawing Sheets

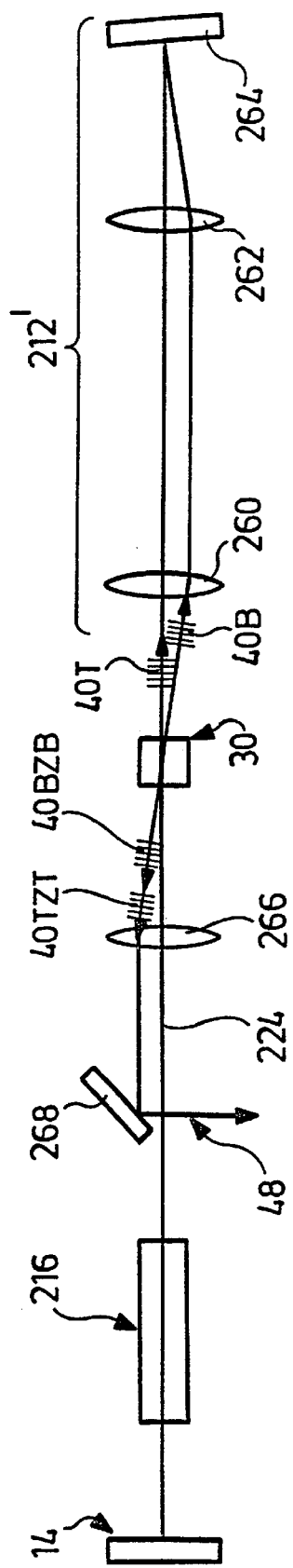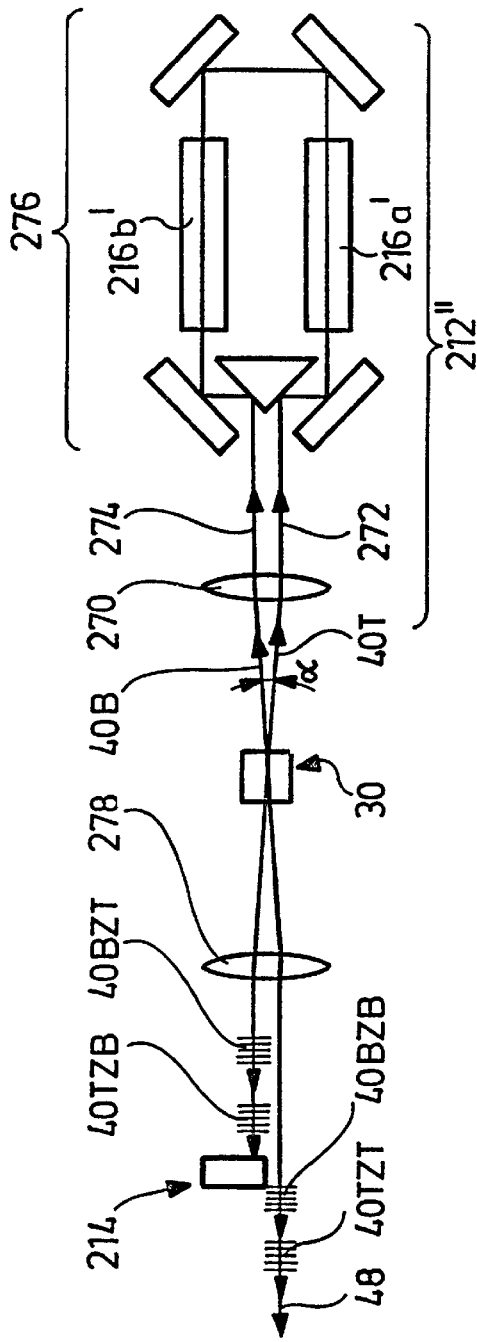
FIG. 14
FIG. 15

OPTICAL MODULATION DEVICE

The present disclosure relates to the subject matter disclosed in International Application No. PCT/EP00/01802 (WO 00/52520) of Mar. 2, 2000, the entire specification of which is incorporated herein by reference.

The invention relates to an optical modulation device for coupling an entering radiation field to at least one of two exiting radiation fields, comprising an acousto-optical modulator, a first sound (e.g., acoustic) wave field travelling through the acousto-optically active medium of this modulator in a sound propagation direction and by means of a first acousto-optical modulation dividing a radiation field incident in an entry direction and coupled to the entering radiation field essentially into a transmitted branch propagating in the direction of a beam axis of the incident radiation field and a diffracted branch extending with its beam axis at an angle of diffraction of the first order in relation to the beam axis of the transmitted branch, wherein an angle bisector between the beam axis of the incident radiation field and the beam axis of the diffracted branch extends approximately parallel to the sound propagation direction of the sound wave field.

Optical modulation devices of this type are known, for example, from the book "Fundamentals of Photonics" of Bahaa E. A. Saleh and Malvin Carl Teich, John Reiley and Sons, New York, 1991, page 799 to page 831.

In the case of these modulation devices there is, however, the problem that when these modulation devices are intended to be used for the switching of radiation fields, diffraction efficiencies of up to 100% must be achieved and these can be achieved, if at all, only with considerable resources.

The object underlying the invention is therefore to improve an optical modulation device of the generic type in such a manner that as efficient a switching of the incident radiation field as possible between the exiting radiation fields is possible.

This object is accomplished in accordance with the invention, in an optical modulation device of the type described at the outset, in that a radiation guide system is provided which deflects the diffracted branch resulting during the first acousto-optical modulation and the transmitted branch such that with their beam axes extending approximately at the angle of diffraction of the first order relative to one another they interact with a travelling second sound wave field having approximately the same frequency as the first sound wave field in order to generate a second acousto-optical modulation, whereby essentially a diffracted and a transmitted branch respectively result from the deflected, diffracted branch and the deflected, transmitted branch, that the direction of propagation of the second sound wave field is aligned relative to the deflected, diffracted branch and the deflected, transmitted branch such that the transmitted branch resulting from the deflected, diffracted branch and the diffracted branch resulting from the deflected, transmitted branch propagate in approximately the same direction, are superimposed at least partially and thereby have essentially the same frequency so that these at least partially superimposed branches form a first radiation field as a result of essentially constructive interference, and in addition the transmitted branch resulting from the deflected, transmitted branch and the diffracted branch resulting from the deflected, diffracted branch propagate in the same direction, are at least partially superimposed and thereby have essentially the same frequency so that these at least partially superimposed branches form a second radiation field as a result of essentially destructive interference, and that the first radiation field is coupled to the first exiting radiation field and the second radiation field to the second exiting radiation field.

The advantage of the inventive solution is to be seen in the fact that as a result of the inventive execution of the second acousto-optical modulation in such a manner that two respective branches result which are superimposed and have the same frequency, constructive and destructive interference can respectively be used to form the first radiation field and the second radiation field from the respective branches.

As a result, large variations in intensity between the first and second radiation fields are possible at a low diffraction efficiency. For example, it is sufficient to be able to operate the first acousto-optical modulation and the second acousto-optical modulation with a diffraction efficiency of at the most 50% in order to couple the entering radiation field completely into the first radiation field or the second radiation field.

This allows, in particular, use of simple optical modulators and a lower high-frequency power for generating the sound wave fields and so, as a result, the acousto-optical modulators can, altogether, be constructed and operated more simply.

Particularly high intensities of the first radiation field may be obtained when the branches forming the first radiation field are superimposed in essential parts.

A partial superposition is also sufficient with respect to the branches forming the second radiation field, wherein for achieving intensities which are as high as possible the branches forming the second radiation field are likewise superimposed in essential parts where possible.

With respect to generating the first and second sound wave fields it would, in principle, be conceivable to use different sound generators with different sound frequency generators.

However, in order to ensure that the frequencies of the first and second sound wave fields are as close to one another as possible or even identical it is preferably provided for the first and second sound wave fields to be generated with a single sound frequency generator.

Furthermore, in order to achieve as uniform a diffraction efficiency as possible during the first acousto-optical modulation and the second acousto-optical modulation it is preferably provided for the first and the second sound wave fields to have amplitudes of essentially the same size.

In the case of an inventive modulation device a concept which is as simple as possible provides for the first acousto-optical modulation and the second acousto-optical modulation to take place in separate acousto-optical modulators so that it is also possible, due to this separation of the acousto-optical modulators, to vary the individual, acousto-optical modulations with respect to the diffraction efficiency.

This solution is particularly favorable when the diffraction efficiency of the first acousto-optical modulation or the second acousto-optical modulation is intended to be different in relation to the diffraction efficiency of the respectively other acousto-optical modulation.

With this solution, it is possible, in particular, to select optional intensities of the first radiation field and the second radiation field.

However, in order to be able to ensure in as simple a manner as possible that the first and the second acousto-optical modulations take place with the same frequency and under the same overall conditions, it is preferably provided for the first acousto-optical modulation and the second acousto-optical modulation to take place in the same acousto-optical modulator, in which a single sound wave then propagates and a single grating of wave fronts is generated, at which the two acousto-optical modulations take place.

Even when carrying out the two acousto-optical modulations in one and the same modulator it is possible to have the first acousto-optical modulation and the second acousto-optical modulation carried out in the same acousto-optical modulator essentially spatially separable so that a simple separation of the first radiation field and the second radiation field from the incident radiation field is also possible.

The construction of the radiation guide device and the radiation guidance itself may, in particular, be simplified even more when the first acousto-optical modulation and the second acousto-optical modulation take place essentially in the same volume area of the acousto-optical modulator so that, as a result, it is also ensured that the same conditions exist for the two acousto-optical modulations.

No further details have so far been given with respect to the alignment of the beam axes during the two acousto-optical modulations relative to the respective sound propagation direction. One advantageous embodiment provides for a beam axis of the incident radiation field and a beam axis of the diffracted branch resulting during the first acousto-optical modulation as well as a beam axis of the transmitted branch to define a first plane of modulation approximately parallel to the first sound propagation direction and during the second acousto-optical modulation for the beam axes of the diffracted and transmitted branches resulting from the diffracted branch and the transmitted branch to define a second plane of modulation approximately parallel to the second sound propagation direction.

As a result of the fact that the first acousto-optical modulation and the second acousto-optical modulation take place in a respective plane the two acousto-optical modulations may be separated or combined as required by way of suitable positioning of the planes.

One advantageous embodiment, for example, provides for the first and the second planes of modulation to be located in a common plane, whereby the beam guidance is simplified during the generation of the deflected, diffracted branch and the deflected, transmitted branch, wherein it is not automatically determined as a result that the two acousto-optical modulations cannot take place separately in the acousto-optical modulator.

Furthermore, it is also not determined as a result that one acousto-optical modulator must automatically be used. Even when the first and second planes of modulation are located in a common plane, it is still possible to use two acousto-optical modulators which are separate from one another.

A further, advantageous solution provides for the first and second planes of modulation to be arranged to as to be offset parallel to one another. This arrangement of the two planes of modulation creates the possibility of separating the first radiation field and the second radiation field from the incident radiation field in a simple manner even when both modulations take place in a single acousto-optical modulator.

Another favorable possibility for the separation between the incident radiation field, on the one hand, and the first radiation field and the second radiation field which result following the second acousto-optical modulation, on the other hand, consists in having the first plane of modulation and the second plane of modulation extending at an angle to one another.

This solution also does not automatically require the first acousto-optical modulation and the second acousto-optical modulation to be carried out in a single acousto-optical modulator. With this solution, as well, the two acousto-optical modulators may be arranged separately from one another.

When both acousto-optical modulations take place in one acousto-optical modulator it is advantageously provided for the first plane of modulation and the second plane of modulation to intersect and have a line of intersection extending parallel to the sound propagation direction of the sound wave field.

A particularly favorable solution provides for the line of intersection to extend through the volume area of the acousto-optical modulator, in which the first acousto-optical modulation and the second acousto-optical modulation take place so that the same grating of wave fronts is, where possible, essentially responsible for the two acousto-optical modulations.

With respect to the design of the radiation guide system no further details have been given in conjunction with the preceding explanations concerning the individual embodiments. One advantageous embodiment, for example, provides for the radiation guide system to divert the diffracted branch resulting during the first acousto-optical modulation and the transmitted branch from the first plane of modulation into the second plane of modulation and then in the second plane of modulation to supply them to the second acousto-optical modulation as a deflected, diffracted branch and as a deflected, transmitted branch.

In this respect, when two acousto-optical modulators are used the radiation guide system can be designed such that it deflects the diffracted branch and the transmitted branch from the first acousto-optical modulator and supplies them to the second acousto-optical modulator.

In the case of a single acousto-optical modulator the radiation guide system is preferably designed such that it returns the diffracted branch resulting during the first acousto-optical modulation and the transmitted branch to the same acousto-optical modulator as a deflected, diffracted branch and a deflected, transmitted branch.

Particularly favorable conditions are present for the second acousto-optical modulation when the diffracted branch runs to the second acousto-optical modulation approximately parallel to the transmitted branch resulting during the first acousto-optical modulation.

Furthermore, it is preferably provided for the transmitted branch to run to the second acousto-optical modulation approximately parallel to the diffracted branch resulting during the first acousto-optical modulation.

These conditions with respect to the parallel course of the various branches may, however, be fulfilled only when the first and second planes of modulation are either offset in parallel or coincide in one plane.

With respect to the radiation guide properties of the radiation guide system, no further details have been given in conjunction with the preceding explanations concerning the individual embodiments.

One particularly advantageous embodiment of the inventive radiation guide system, for example, provides for this to deflect the diffracted branch and the transmitted branch such that the optical path between the first acousto-optical modulation and the second acousto-optical modulation is approximately the same in both branches.

The optical path of the radiation guide system can expediently be selected such that the relative phase position of the individual branches of the branches interfering with one another can be determined in a defined manner for the formation of the first radiation field and the second radiation field.

An inventive radiation guide system can be realized in the most varied of ways.

One possibility can be brought about by way of light guides, wherein a respective, separate light guide can be provided, for example, for the diffracted branch 40B and the transmitted branch 40T.

The return of the individual branches is also possible, for example, due to the fact that the transmitted branch is coupled into one end of a light guide and the diffracted branch into the other end and the returned branches then exit again at the respectively opposite ends.

Another solution provides for the radiation guide system to have at least two beam deflections which cause the branches running apart at the angle of diffraction to run towards one another again at the angle of diffraction, for example, as returned branches.

The beam deflections are preferably formed by reflector surfaces.

In this respect, it is preferably provided for the two reflector surfaces to extend towards one another at an angle of less than 90°.

Another solution provides for a reflector and an optical imaging means, for example, an optical telescope comprising at least two lenses.

No further details have so far been given with respect to the design of the radiation return system.

One advantageous embodiment provides for the radiation return system to align the returned branches such that they run towards one another in the acousto-optical modulator such that the transmitted and diffracted branches resulting from them again result as close as possible to one another.

This is preferably brought about such that the branches intersect one another again in the acousto-optical modulator at least in sections, even better essentially completely.

In one case, it is provided for the respective returned branch to run parallel to the respectively other branch in the acousto-optical modulator.

A particularly favorable solution, in particular, with a view to the formation of a returning first radiation field which is as uniform as possible from a spatial point of view and a second radiation field which is as uniform as possible from a spatial point of view provides for the first radiation return system to cause the returned branches to extend in the optically active volume of the acousto-optical modulator such that they intersect one another at least partially approximately in the junction area of a division into the transmitted and the diffracted branches, wherein the one respective returned branch preferably extends approximately congruent but with an opposite direction of propagation to the respectively other branch in the optically active volume area within the acousto-optical modulator. As a result, the transmitted and diffracted branches resulting again from the returned branches also coincide essentially with one another.

Another alternative solution provides for the radiation guide system to return the returned branches as branches running apart from one another in the acousto-optical modulator, i.e. the respective returned branches, formed, for example, due to reflection not only of the transmitted branch but also of the diffracted branch, extend in the acousto-optically active medium within the acousto-optical modulator as branches running apart from one another.

It is also conceivable with this relative orientation of the returned branches to couple the transmitted branch and the diffracted branch into a respective light guide and to cause them to exit from this light guide again at the other end with a corresponding alignment.

A particularly simple radiation guide system is preferably constructed such that it has a single reflector.

The one reflector is preferably aligned such that a radiation field impinging on it is reflected back at an angle of return reflection which corresponds to the angle of diffraction of the first order of the acousto-optical modulator.

In this respect, the reflector is preferably designed such that it has a flat reflector surface which is aligned in accordance with the angle of return reflection.

The reflector surface may be part of a reflector separate from the acousto-optical modulator.

Another advantageous solution provides for the acousto-optical modulator to bear the reflector on a side surface on the exit side for the radiation field incident in it.

In the simplest case, such a reflector may be produced on the side surface of the acousto-optical modulator on the exit side when the side surface of the acousto-optical modulator is covered, preferably coated, with a reflector layer.

With all the variations of the inventive solution, with which the returned branches likewise enter the optically active volume area of the acousto-optical modulator as branches running apart from one another, the branches forming not only the returning radiation field but also the radiation field coupled out are offset in a direction transverse to their direction of propagation.

This offsetting does, however, preferably lie within the cross section of the radiation field forming altogether and so this does not have any appreciable affect when the reflector layer is arranged close to a junction of the branches in the acousto-optical modulator, i.e. the acousto-optical modulator has an extension in the direction of propagation of the incident radiation field which is as limited as possible and is required only for a sufficient interaction.

One advantageous possibility for separating entering radiation field and exiting radiation fields despite coinciding planes of modulation provides for a separation of the entering radiation field from at least one of the exiting radiation fields to be achievable in that the first radiation field extends at a distance from the incident radiation field and thus is separate from it. As a result, the first radiation field does not run back approximately in the direction of the incident radiation field or overlap with it but the first radiation field is rather completely separate from the incident radiation field.

In this respect, it is also even more advantageous when the second radiation field extends at a distance from the branch diffracted away from the incident radiation field.

With this solution, the separation of entering radiation field and exiting radiation field is already ensured by the separation of the first and the second radiation fields from the incident radiation field since no optical components whatsoever are required in order to bring about a separation of this type.

This may be achieved particularly simply in one embodiment of the inventive solution in that the returned transmitted branch and the returned diffracted branch interact in an area of the acousto-optical modulator which is arranged so as to be offset in relation to the area of the division of the incident radiation field into the diffracted and transmitted branches in a direction approximately parallel to the direction of propagation of the sound wave, i.e. an offsetting is possible not only in the direction of the direction of propagation of the sound wave but also in the opposite direction to the direction of propagation of the sound wave and as a result of this parallel offsetting the returned transmitted and the returned diffracted branches can again interact with one another and the first radiation field and the second radiation field then result from this interaction and these fields extend spatially separate from and, in particular, not overlapped by the incident radiation field so that the first radiation field and the second radiation field can directly form the first exiting radiation field and the second exiting radiation field, respectively.

One particularly advantageous embodiment provides for the radiation return system and the acousto-optical modulator to interact such that a first radiation field and a second radiation field exit from the acousto-optical modulator and these fields propagate in directions which have at least one directional component extending in the opposite direction to the direction of propagation of the incident radiation field.

A particularly favorable arrangement of acousto-optical modulator and radiation return system provides for the first radiation field exiting from the acousto-optical modulator on a side located opposite the radiation return system to extend approximately parallel to the incident radiation field and for the second radiation field to extend at an angle of diffraction of the first order in relation to the first radiation field.

With such an arrangement, particularly favorable ratios may be achieved by way of two-time diffraction effects which are respectively based on the same principle and, together with the radiation return system, cause altogether superposition effects to be generated which correspond to those of an "anti-resonant ring interferometer".

In order, for example, in the preceding arrangement to separate the exiting radiation field to be formed from the first radiation field from the entering radiation field it is preferably provided for at least one incident radiation field polarized in one direction to be generatable in the modulator unit from the entering radiation field.

In order, for example, in the case of the polarization explained above to avoid losses in intensity in the case of unpolarized light it is preferably provided for two incident radiation fields with directions of polarization at right angles to one another to be generatable from the entering radiation field.

A particularly favorable separation of entering radiation field and at least one of the exiting radiation fields is possible due to the fact that the polarized first radiation fields resulting from the entering radiation field experience a rotation of polarization through altogether ±90° until the exiting radiation fields are formed.

Such a rotation of polarization can be achieved, for example, in that the respective incident radiation field experiences a rotation of polarization through 45° in a polarization-influencing element and the first radiation field exiting from the acousto-optical modulator experiences a further rotation through 45° as a result of the same polarization-influencing element.

Alternatively thereto it is, however, also conceivable to use polarization-influencing elements which turn the direction of polarization of the incident radiation field through 90° and leave unaffected the direction of polarization of the first radiation field passing through them.

One embodiment of a modulator unit which separates the entering radiation field from at least one of the exiting radiation fields provides for an optical diode, on which the entering radiation field impinges and from which the returning first radiation field also exits in the form of one of the exiting radiation fields.

A particularly advantageous inventive embodiment provides for a radiation return system to return the branches, which propagate in the acousto-optical modulator in their exiting directions and are incident in the radiation return system, to the acousto-optical modulator at a respective angle to the exiting directions which corresponds approximately to the angle of diffraction of the first order, for the radiation return system to be arranged such that it returns the transmitted branch propagating in the acousto-optical modulator in exiting direction and the corresponding diffracted branch propagating in exiting direction to the acousto-optical modulator such that the returned transmitted branch and the returned diffracted branch extend in the acousto-optical modulator approximately parallel to the diffracted branch propagating in exiting direction or approximately parallel to the transmitted branch propagating in exiting direction, and for the transmitted and diffracted branches respectively resulting from the returned transmitted branch and the returned diffracted branch to be superimposed to form a first radiation field and a second radiation field, each of which is coupled to one of the exiting radiation fields.

The advantage of this embodiment is to be seen in the fact that as a result of the inventive design of the radiation return system each returned branch extends in the acousto-optical modulator approximately parallel to the respectively other branch and is divided in the modulator into a transmitted branch and a diffracted branch so that a first or returning radiation field exits from the acousto-optical modulator which is approximately parallel to the incident radiation field but propagates in the opposite direction and has the branches of the radiation field which have resulted on their way from the incident radiation field to the first radiation field due to a one-time diffraction in the acousto-optical modulator whereas a second radiation field exiting from the acousto-optical modulator propagates approximately parallel to the diffracted branch and thus at the angle of diffraction of the first order in relation to the first radiation field and has the branches which have resulted on their way from the incident radiation field to the second radiation field either as a result of no diffraction whatsoever or as a result of a two-time diffraction, wherein the first exiting radiation field is formed from the first radiation field and the second exiting radiation field from the second radiation field.

In the case of the inventive solution, the acousto-optical modulator can, for example, be operated together with the radiation return system as a type of anti-resonant ring interferometer, wherein a complete coupling of the incident radiation field into the first, returning radiation field is already possible at a diffraction efficiency of the acousto-optical modulator of approximately 50% since the branches which have been diffracted one time are constructively superimposed whereas the transmitted branch and the branch diffracted two times, which are superimposed destructively to form the second radiation field, can cancel one another out, whereby an acousto-optical modulator which is of a simple construction and operated with simple means can already be used.

The operation of the acousto-optical modulator with the radiation return system as "a type of anti-resonant ring interferometer" is to be understood such that the known "anti-resonant ring interferometer" represents the starting point for considerations but it has also to be taken into account that the acoustic grating moves along in time and thus an acoustic grating altered as a result of the transit time results for the returned branches. Furthermore, the shift in frequency in the diffracted branch and the length of the path of the branches returned again to the acousto-optical modulator by the radiation return system have also to be taken into consideration.

In addition, when the acousto-optical modulator is not acted upon with a sound wave and thus has the diffraction efficiency zero the modulator allows an essentially complete coupling of the incident radiation field into the second divided radiation field on account of the transmitted branches exclusively being formed.

The inventive solution thus creates the possibility, despite one or two acousto-optical modulators which are of a simple construction and merely have to achieve values of the diffraction efficiency in the range of approximately 0% to approximately 50%, of changing efficiently between a maximum coupling of the entering radiation field to the first exiting radiation field or to the second exiting radiation field.

In principle, it would be conceivable to operate the acousto-optical modulator or modulators only with two different diffraction efficiencies in order to achieve the desired modulation effects, i.e. a switching over from the first exiting radiation field to the second exiting radiation field.

It would, for example, be conceivable to operate the first and second acousto-optical modulators at a diffraction efficiency of either approximately 0% or approximately 50%.

It is, however, also conceivable within the scope of the inventive solution for the acousto-optical modulator to be operable in the range between a diffraction efficiency of approximately 0% and approximately 50% so that all the possible different degrees of coupling between the entering radiation field and the two exiting radiation fields can be set.

The inventive modulation device can, in principle, be used as required when it is a question of modulating radiation fields. For example, the inventive modulation device may be used as an external element, with which an external modulation of radiation fields and/or a mixing of radiation fields and/or also a shift in frequency of radiation fields can be carried out.

The inventive modulation device may be used advantageously, in particular, when this is arranged in an amplifying radiation field of a laser amplifier so that the advantages of the acousto-optical modulation can be used for coupling radiation fields in and out.

A particularly favorable solution provides for the modulation device to have an amplifying radiation field of a feedback laser amplifying system passing through it.

In this respect, it is possible to integrate the inventive modulation device into the laser amplifying system as a separate component.

The inventive modulation device may be used particularly favorably when this is part of a feedback laser amplifying system, i.e. not only modulates the amplifying radiation field but also serves directly for the feedback thereof.

This may be realized particularly simply when the radiation guide system of the inventive modulation device is an amplifying radiation return system of the feedback laser amplifying system.

In addition, the invention also relates, however, to a laser amplifying system comprising a feedback optical amplifier with two amplifying radiation return systems, an optical volume area which extends between the amplifying radiation return systems and passes through a laser-active medium and within which an amplifying radiation field is formed, i.e. results or is amplified, an acousto-optical modulator which has the optically active volume area and the radiation field passing through it and from which acoustic wave fronts propagate in a sound propagation direction and generate a grating, by means of which an incident amplifying radiation field can be divided into a respective transmitted branch and a respective diffracted branch extending at an angle of diffraction of the first order in relation to the transmitted branch.

Laser amplifying systems of this type are known, for example, from the book "Solid-State Laser Engineering" by Walter Koechner, Springer Series in Optical Sciences, ISBN 3-540-60237-2, 1996, pages 494 to 499.

With such a laser amplifying system, the acousto-optical modulator is used such that the transmitted branch is coupled back in the resonator and the resonator losses can be modulated due to division of the incident radiation field into the transmitted branch and the diffracted branch. In this respect, the depth of modulation depends on the losses from the maximum achievable diffraction efficiency of the acousto-optical modulator.

In a different laser amplifying system of this type, the acousto-optical modulator is likewise operated in transmission in the resonator but the diffracted branch is used to couple out the laser power. In this embodiment, the frequency of the diffracted branch is shifted, on the one hand, and, on the other hand, the coupling out is dependent on the maximum achievable diffraction efficiency of the acousto-optical modulator. Furthermore, two diffracted beams are generally coupled out in the case of such resonators unless ring resonators are used, in which the radiation extends only in one direction.

Furthermore, systems of this type are known from Bonnet et al., Optics Communications 123 (1996), pages 790–800.

In the case of such laser amplifying systems, the diffracted branch of the acousto-optical modulator is coupled back in the resonator and the transmitted branch serves for the coupling out or contributes to the loss. In this embodiment, the frequency of the branch coupled back in the resonator is shifted and, on the other hand, the coupling back is dependent on the maximum achievable diffraction efficiency of the acousto-optical modulator.

The object underlying the invention is therefore to improve a laser amplifying system of the generic type in such a manner that this allows as efficient a division of the radiation field as possible without any complicated construction or complicated operation of the acousto-optical modulator.

This object is accomplished in accordance with the invention, in a laser amplifying system of the type described above, in that a modulation device is provided in accordance with any one of the embodiments described above, the radiation guide system of which forms the first amplifying radiation return system and the incident radiation field of which is the amplifying radiation field.

This solution likewise has the advantage that a modulation of the amplifying radiation field is possible with great efficiency with a simple construction of the acousto-optical modulator.

In this respect, it is, for example, conceivable for one of the exiting radiation fields of the modulation device to be coupled back into the optical amplifier.

When the inventive modulation device is provided for the coupling out of a radiation field this is preferably used such that the other one of the exiting radiation fields can be coupled out of the laser amplifying system.

Alternatively to the solutions of the inventive laser amplifying system described above or supplementary thereto, one particularly favorable solution provides for a first one of the amplifying radiation return systems to return to the acousto-optical modulator the branches which are incident in the first amplifying radiation return system and propagate in the acousto-optical modulator along their beam axes and which result in the acousto-optical modulator during the first acousto-optical modulation, that an angle between them corresponds approximately to the angle of diffraction of the first order, that the first amplifying radiation return system is arranged such that it returns to the acousto-optical modulator the transmitted branch formed in the acousto-optical modulator during the first acousto-optical modulation and the corresponding diffracted branch such that the returned transmitted branch forms approximately the same angle with the sound propagation direction as the diffracted branch formed during the first acousto-optical modulation and that the returned diffracted branch forms approximately the same angle with the sound propagation direction as the transmitted branch formed during the first acousto-optical modulation and that the returned transmitted branch and the returned diffracted branch extend in the acousto-optical modulator such that the transmitted and diffracted branches respectively resulting from the returned transmitted branch and the returned diffracted branch are superimposed to form a first radiation field and to form a second radiation field.

The advantage of the inventive solution is to be seen in the fact that the incident radiation field is divided into two radiation fields exiting from the acousto-optical modulator as a result of the inventive design of the first amplifying radiation return system in that that designated as first radiation field has the branches which have resulted on their way from the incident radiation field to the first radiation field as a result of a one-time diffraction and one-time transmission whereas that designated as second radiation field has the branches which have come about on their way from the incident radiation field to the second radiation field either as a result of no diffraction whatsoever or as a result of a two-time diffraction, wherein the first radiation field forms approximately the same angle with the direction of propagation of the sound waves in the acousto-optical modulator as the incident radiation field and the second radiation field forms with the direction of propagation of the sound waves approximately an angle altered in relation to the incident radiation field by the angle of diffraction of the first order so that, for example, with the inventive design of the first amplifying radiation return system different alignments of the first radiation field and of the second radiation field relative to the incident radiation field can also be achieved.

With the inventive solution, the acousto-optical modulator can preferably be operated together with the first amplifying radiation return system as a type of "anti-resonant ring interferometer", wherein a more or less complete coupling into the first, returning radiation field is already possible at a diffraction efficiency of the acousto-optical modulator of approximately 50% since the branches which have been diffracted one time and transmitted one time can be superim-posed constructively whereas the branch transmitted two times and the branch diffracted two times can be superimposed de-structively to form the second radiation field and thus cancel one another out, whereby an acousto-optical modulator can be used which is of a simple construction and operated with simple means.

The fact that an acousto-optical modulator with a low diffraction efficiency can be used efficiently makes a greater freedom in material selection and design possible.

The operation of the acousto-optical modulator together with the first amplifying radiation return system as "a type of anti-resonant ring interferometer" is to be understood such that the starting point for considerations is represented by the known "anti-resonant ring interferometer" or also Sagnac interferometer, in which the acousto-optical modulator is used as a beam splitter, but it has to be taken into consideration, in addition, that the beam splitter is provided by a volume grating moving along in time and thus no defined, beam-splitting surface is present and an altered grating results, in addition, for the returned branches as a result of the transit time. Furthermore, the shift in frequency in the diffracted branch and the length of the path of the returned branches have also to be considered.

If the acousto-optical modulator is not acted upon with a sound wave and thus has the diffraction efficiency zero, the acousto-optical modulator no longer acts with the amplifying radiation return system as an anti-resonant ring interferometer on account of the transmitted branches exclusively forming and an essentially complete coupling of the incident radiation field into the second, divided radiation field takes place.

The inventive solution thus creates the possibility, despite an acousto-optical modulator which is of a simple construction and must only reach a diffraction efficiency of approximately 0% to 50%, of changing between maximum coupling to the first radiation field or to the second radiation field.

In principle, it would be conceivable to operate the acousto-optical modulator with two different diffraction efficiencies in order to achieve the desired modulation effects. For example, it would be conceivable to operate the acousto-optical modulator at a diffraction efficiency of approximately 0% and approximately 50%.

It is, however, particularly favorable when the acousto-optical modulator can be operated in the range of a diffraction efficiency of approximately 0% and approximately 50% so that all the possible, different degrees of coupling of the incident radiation field to the first and the second radiation fields can be set.

With the inventive solution, the acousto-optical modulator can form together with the first amplifying radiation return system an interferometer, with which, in contrast to the example designated as a type of anti-resonant ring interferometer, the two returned branches do not return to the modulator again in the opposite direction more or less along the identical path from the modulator via the first amplifying radiation return system but rather extend in such a manner that the first radiation field may be separated spatially from the incident radiation field.

With respect to the possibilities for the advantageous coupling of the incident radiation field to the first and the second radiation fields, for which acousto-optical modulators with a diffraction efficiency of approximately 0% to approximately 50% are adequate, the same statements apply as in the case of the construction as a type of anti-resonant ring interferometer.

A look at the symmetry of such arrangements shows that a further incident radiation field may be coupled in in an opposite direction in relation to one of the exiting radiation fields looked at previously and this radiation field is again divided into two exiting radiation fields, in principle, in the same way, one of these exiting radiation fields extending in a more or less opposite direction to the incident radiation field looked at previously.

With an arrangement in accordance with a type of anti-resonant ring interferometer two incident radiation fields can therefore be coupled in and these fields may be respectively divided into a first radiation field and a second radiation field, wherein the first radiation field extends each time more or less in an opposite direction to the corresponding incident radiation field whereas the second radiation field extends each time in a more or less opposite direction to the respectively other incident radiation field so that the first radiation field of the one incident radiation field exits each time in more or less the same direction as the second radiation field of the other incident radiation field.

For the arrangement deviating from the type antiresonant ring interferometer, with which the exiting first radiation field is to be separated spatially from the corresponding incident radiation field, two respective pairs of incident radiation fields are accordingly conceivable, for which it is possible for the first radiation field of the one incident radiation field to extend in approximately the same direction as the second radiation field of the other incident beam of the same pair and in a more or less opposite direction each time to one of the incident radiation fields of the other pair.

With respect to how the feedback amplifier is intended to be operated, no further details have been given in conjunction with the preceding explanations concerning the individual advantageous embodiments of the inventive solution.

One advantageous embodiment, for example, provides for the first radiation field to be returned to the laser-active medium, i.e. the first radiation field with its frequency shifted is returned to the laser-active medium and thus no feedback of the radiation field resulting in the acousto-optical modulator in the form of an identical radiation field takes place but rather a feedback in the form of a radiation field with its frequency shifted, whereby properties differing from a known optical standing wave resonator can be formed.

In principle, it would be conceivable for the first radiation field to be coupled back into the laser-active medium via separate feedback elements.

The feedback of the first radiation field may, however, be brought about particularly favorably when the first radiation field is returned to the laser-active medium by means of the elements guiding the incident radiation field to the acousto-optical modulator.

As a result, a return of the first radiation field can be brought about in an advantageous manner without additional optical elements.

This is preferably possible when the first radiation field results within the acousto-optical modulator in an area which is located within the optically active volume area so that the first radiation field results such that locally it coincides essentially with the incident radiation field but propagates in an opposite direction to it.

Another advantageous solution consists in the second amplifying radiation return system being designed such that the first radiation field is returned to the incident radiation field again through it.

Such a feedback of the first radiation field to the laser-active medium is possible, in particular, when the first radiation field has a power greater than zero on account of diffraction effects in the case of an acousto-optical modulator operating at a finite diffraction efficiency.

A particularly high feedback by means of the first radiation field results when the acousto-optical modulator operates with a diffraction efficiency of approximately 50%.

A further, advantageous solution in the case of the inventive laser amplifying system provides for the second radiation field to be returned to the laser-active medium. Such a return has the advantage that the frequency of the second radiation field is not shifted and thus this creates the possibility of bringing about a feedback with a radiation field of identical frequency.

Such a feedback may take place in the most varied of ways. It is particularly favorable when the second radiation field is returned to the laser-active medium by being returned to the acousto-optical modulator and via this as well as the first amplifying radiation return system; as a result a return can be brought about in a particularly favorable manner without many additional components.

It is particularly favorable when the second radiation field is returned to the laser-active medium due to reflection into itself so that the same optical components which contribute to the formation of the second radiation field can essentially be used.

Such a return of the second radiation field always takes place when the resulting second radiation field does not have the power zero.

A feedback to the laser-active medium which is, in particular, essentially complete occurs when the total power of the incident radiation field is essentially found again in the second radiation field so that the essentially entire power enters the laser-active medium due to reflection of this second radiation field back into itself or due to a return of this second radiation field via the active medium to the first radiation field again.

This is the case, in particular, when the acousto-optical modulator operates with a diffraction efficiency of approximately zero or approximately 100%.

In order, in particular, to be able to couple out laser radiation favorably, a particularly advantageous embodiment of the inventive laser amplifying system provides for the first or the second radiation field to form the radiation field returned to the laser active medium and for the respectively other radiation field to form the radiation field coupled out.

With this solution it is possible to use one of the two radiation fields as a radiation field coupled out and the other for the feedback to the laser-active medium.

Which of the two radiation field is, in the end, coupled out or not depends on the individual possibilities for realizing the inventive laser amplifying system.

In the case of several realization possibilities it is advantageous to feed the first radiation field and thus the radiation field with its frequency shifted back again into the laser-active medium whereas in the case of other embodiments, in particular, when an optimum feedback is desired, to couple out the second radiation field, the frequency of which is shifted, so that a frequency-identical feedback to the laser-active medium can be realized.

With respect to the manner, in which the first amplifying radiation return system acts on the branches forming in the acousto-optical modulator, different solutions are conceivable.

With respect to the position of the returned branches in the acousto-optical modulator, the most varied of solutions are conceivable.

One possibility provides for the returned branches to be aligned in the acousto-optical modulator such that one of the resulting radiation fields, preferably the first radiation field, can be coupled into the laser-active medium.

The first radiation field preferably propagates in the direction of the laser-active medium essentially overlapping with the incident radiation field so that it can be guided through the same optical elements as the incident radiation field.

With this solution the second radiation field can be used directly as a radiation field which is coupled out when the first radiation field is fed back into the laser-active medium.

If, on the other hand, the second radiation field is to be coupled back into the laser-active medium, the first radiation field will, for example, be separated from the incident radiation field as a result of polarization effects, in particular, splitting of the radiation field into two polarization components oriented orthogonally to one another as well as polarization rotations or phase shifts between the polarization components.

Another possibility is to align the returned branches in the acousto-optical modulator such that the first radiation field is to be separated spatially from the incident radiation field in that at least an angular offset or a space exists between the two radiation fields.

With this solution, the first radiation field is preferably used as a radiation field coupled out whereas the second radiation field can be coupled into the incident radiation field due to reflection back.

Another advantageous solution provides for the second amplifying radiation return system to be designed such that the second radiation field is guided back through it again into the incident radiation field.

One advantageous embodiment provides for the first amplifying radiation return system to align the returned branches such that they run towards one another in the acousto-optical modulator so that the transmitted and diffracted branches resulting from them again result lying as close as possible next to one another.

This is preferably brought about such that the returned branches intersect one another again in the optically active volume area within the acousto-optical modulator at least in sections, even better essentially completely.

Such a radiation guide system can be designed in the most varied of ways.

The returning of the individual branches would, for example, be possible due to the fact that the transmitted branch is coupled into one end of an optical waveguide and the diffracted branch into the other end and the respective returned branches then exit again at the opposite ends.

Another solution provides for the first amplifying radiation return system to have at least two beam deflections which cause the branches running apart from one another at the angle of diffraction to run towards one another again at the angle of diffraction as returned branches.

The beam deflections are preferably designed as reflector surfaces.

In this respect, it is preferably provided for the two reflector surfaces to form with one another an angle of less than 90°.

Another solution provides for a reflector and an optical imaging device, for example, comprising two lenses.

In the simplest case, it is sufficient when the respective returned branch extends in the acousto-optical modulator parallel to the respectively other branch.

A particularly favorable solution, in particular, with a view to the formation of a returning radiation field which is as uniform as possible from a spatial point of view and a radiation field coupled out which is as uniform as possible from a spatial point of view provides for the first amplifying radiation return system to cause the returned branches to extend in the optically active volume of the acousto-optical modulator such that they intersect at least partially approximately in the area of a division into the transmitted and the diffracted branches, wherein the one respective returned branch preferably extends in the optically active volume area within the acousto-optical modulator approximately congruent but with an opposite direction of propagation to the respectively other branch. As a result, the transmitted and diffracted branches again resulting from the returned branches also coincide essentially with one another.

Another alternative solution provides for the amplifying radiation return system to return the returned branches as branches running apart from one another in the acousto-optical modulator, i.e. the respective returned branches, formed, for example, due to reflection of the transmitted branch as well as the diffracted branch, extend in the optically active volume area within the acousto-optical modulator as branches running apart from one another.

It is also conceivable with this relative orientation of the returned branches to couple the transmitted branch and the diffracted branch into a respective light guide and have them exit from it again at the other end with a corresponding alignment.

A particularly simple amplifying radiation return system is preferably constructed such that it has a single reflector.

The one reflector is preferably aligned such that a radiation field impinging on it is reflected back at an angle of return reflection which corresponds to the angle of diffraction of the first order of the acousto-optical modulator.

In this respect, the reflector is preferably designed such that it has a flat reflector surface which is aligned in accordance with the angle of return reflection.

The reflector surface can be part of a reflector separate from the acousto-optical modulator.

Another advantageous solution provides for the acousto-optical modulator to bear the reflector on a side surface on the exit side for the radiation field incident in it.

In the simplest case, such a reflector may be produced on the side surface of the acousto-optical modulator on the exit side when the side surface of the acousto-optical modulator is covered, preferably by way of vapor deposition, with a reflector layer.

In all the variations of the inventive solution, with which the returned branches likewise enter the optically active volume area of the acousto-optical modulator as branches running apart from one another, the branches forming not only the returning radiation field but also the radiation field coupled out are offset in a direction transverse to their direction of propagation.

This offsetting is, however, preferably within the cross section of the radiation field forming altogether so that this does not have any appreciable effect when the reflector layer is arranged close to a junction of the branches in the acousto-optical modulator, i.e. the acousto-optical modulator has an extension in the direction of propagation of the incident radiation field which is as limited as possible and necessary only for an adequate interaction.

The inventive laser amplifying system in accordance with all the embodiments described thus far can be operated with the most varied of operational modes.

It is, for example, conceivable to use the laser amplifying system as a laser radiation source, wherein the acousto-optical modulator serves to vary the quality within the resonator.

In this case, it would, for example, also be conceivable to realize the coupling out of the usable laser beam in any known way. For example, it is also possible to realize the coupling out by means of a second acousto-optical modulator which could, for example, also interact in an inventive way with the second amplifying radiation return system.

Another advantageous embodiment provides for one of the radiation fields exiting from the acousto-optical modulator to supply the usable laser radiation, wherein either a partial coupling out of the laser radiation building up in the resonator or a complete coupling out can take place.

Another advantageous embodiment of an inventive laser amplifying system is likewise used as a laser radiation source, wherein, in this case, the acousto-optical modulator is used to vary the degree of coupling out in different ways.

One embodiment utilizing this effect advantageously provides for the pulse energy which would be contained in a normal Q-switched pulse to be divided amongst a group of several pulses, i.e. the laser amplifying system to be operated in a so-called burst mode.

Finally, a further possibility of using the inventive laser amplifying system provides for this to likewise be operated as a laser beam source with a mode coupling, wherein it is possible to utilize the fact that the frequency of the returning radiation field is shifted in comparison to the incident radiation field.

Furthermore, the laser amplifying system may be advantageously used for amplifying a radiation field coupled in from outside, such as during injection seeding or during regenerative amplification. The fact that the frequency of the returning radiation field is shifted in comparison with the incident field may also be utilized in the case of such an amplification in multiple transit.

Additional features and advantages of the invention are the subject matter of the following description as well as the drawings illustrating several embodiments.

In the drawings:

FIG. 14 shows a schematic illustration of a first variation of the first embodiment of the inventive laser amplifying system;

FIG. 15 shows a schematic illustration of a second variation of the first embodiment of an inventive laser amplifying system;

Figure 1:
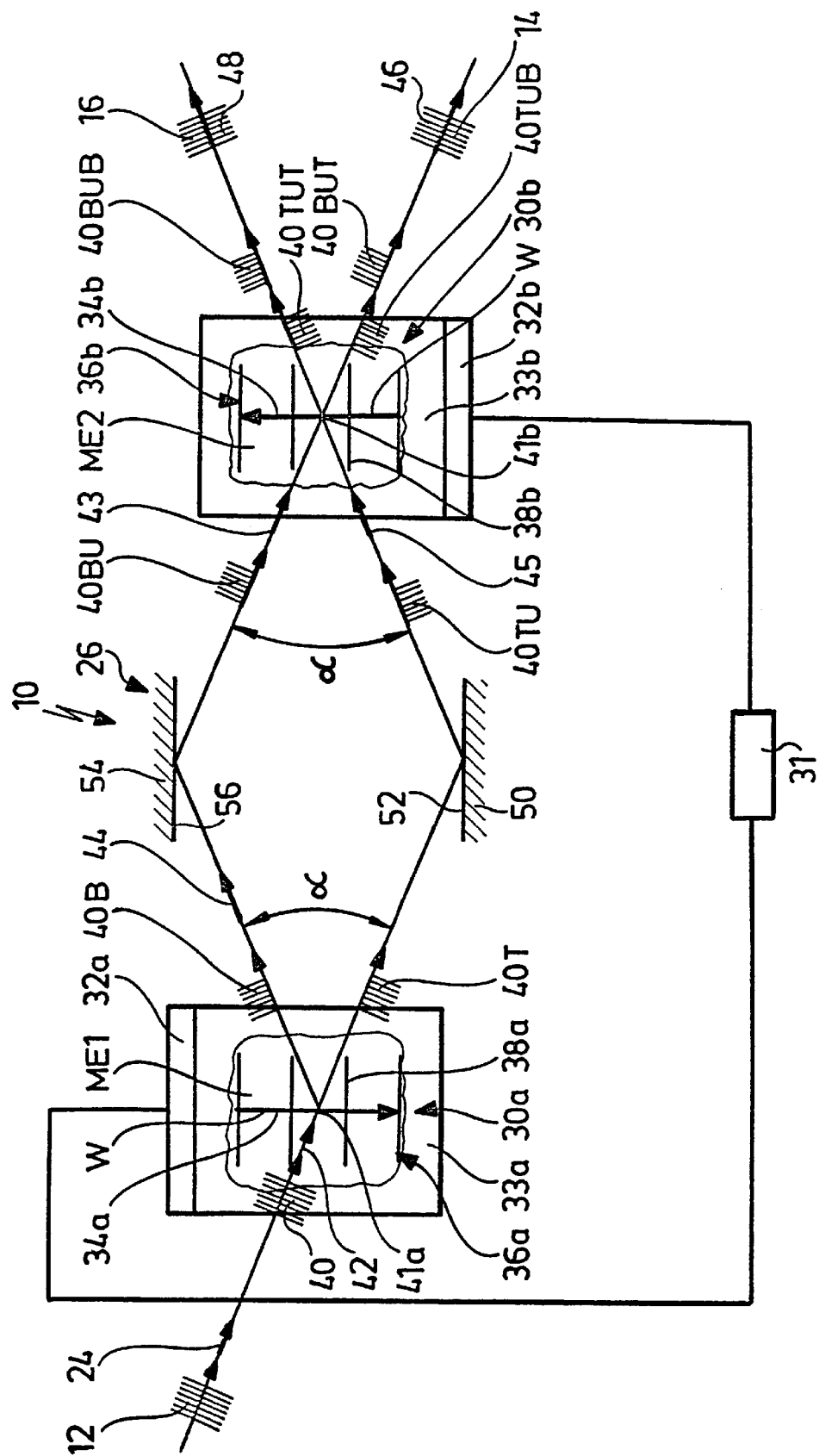
FIG. 1 shows a first embodiment of an inventive modulation device.

A first embodiment of an inventive modulator device designated as a whole as 10 and illustrated in FIG. 1 serves to switch an entering radiation field 12 between a first exiting radiation field 14 and a second exiting radiation field 16, wherein the inventive modulation device can be operated, for example, such that in a first possible switching state only the first exiting radiation field 14 exits and in a second possible switching state only the second exiting radiation field 16. However, it is also conceivable to provide additional switching states, for example, a third possible switching state, with which both exiting radiation fields 14 and 16 exit from the inventive modulation device 10.

The entering radiation field 12 propagates in an entry direction 24 as far as a first acousto-optical modulator 30a, the optically active medium 33a of which is coupled to a sound source 32a which is supplied from a sound frequency generator 31 and generates in the acousto-optically active medium 33a a first sound wave 36a which propagates in a first sound propagation direction 34a and forms a grating 38a of first wave fronts.

The entering radiation field 12 thus becomes, in relation to the first acousto-optical modulator 30a, a radiation field 40 incident therein which propagates in a beam axis 42 and after entering the acousto-optical modulator impinges on the grating 38a of first wave fronts of the first sound wave 36a.

As a result of this grating 38a of wave fronts, the incident radiation field 40 is divided in a first junction area 41a by means of a first acousto-optical modulation into a transmitted branch 40T propagating further along the beam axis 42 as well as a diffracted branch 40B which is diffracted in relation to the entry direction 42 through an angle of diffraction $\alpha$, which corresponds to an angle of diffraction of the first order in relation to the grating 38a of first wave fronts, and propagates in a direction of propagation of the first order along a beam axis 44.

The beam axis 42 of the incident radiation field 40 and the beam axis 44 thereby extend in relation to the first sound propagation direction 34a such that the first sound propagation direction 34a extends parallel to an angle bisector between the beam axis 42 and the beam axis 44.

The beam axis 44 of the diffracted branch 40B resulting during the first acousto-optical modulation defines, together with the beam axis 42, a first plane of modulation ME1 which corresponds to the plane of drawing in the illustration in FIG. 1.

Not only the transmitted branch 40T but also the diffracted branch 40B both propagate further within the first acousto-optical modulator 30a in an exit direction to a radiation guide system 26, wherein for reasons of graphicness the refraction at boundary surfaces of the first acousto-optical modulator 30a is disregarded.

The radiation guide system 26 has, for example, a first mirror 50 with a first mirror surface 52 and a second mirror 54 with a second mirror surface 56, wherein in the present embodiment of the radiation guide system the mirror surfaces 52 and 56 of the mirrors 50 and 54 are arranged so as to face one another and are preferably arranged such that the transmitted branch 40T propagating in the direction of the radiation guide system 26 impinges on the mirror surface 52 and the diffracted branch 40B propagating in the direction of the radiation guide system 26 impinges on the second mirror surface 56, wherein the two mirror surfaces 52 and 56 extend, for example, parallel to one another.

Furthermore, the mirrors 50 and 54 are arranged relative to the transmitted branch 40T and the diffracted branch 40B and relative to one another such that the branches 40T and 40B first running apart from one another at the angle α proceeding from the first acousto-optical modulator 30a are reflected and thus deflected such that they run towards on another again at the angle α, namely in the form of a deflected transmitted branch 40TU and a deflected diffracted branch 40BU.

This deflected transmitted branch 40TU and the deflected diffracted branch 40BU propagate, on the other hand, at the angle α relative to one another in the direction towards one another and are thereby incident in a second acousto-optical modulator 30B, wherein these two deflected branches 40TU and 40BU intersect in a second junction area 41b in the second acousto-optical modulator 30B.

In this respect, a beam axis 45 of the deflected transmitted branch 40TU preferably extends approximately parallel to the beam axis 44 of the diffracted branch 40B and a beam axis 43 of the deflected diffracted branch 40BU approximately parallel to the beam axis 42 of the transmitted branch 40T.

The second acousto-optical modulator 30b also comprises an acousto-optically active medium 33b which is provided with a sound source 32b supplied from the sound frequency generator 31, this source generating in this acousto-optically active medium 33b a sound wave 36b which propagates in a second sound propagation direction 34b with approximately the same frequency as the first sound wave 36a and, for its part, forms a second grating 38b of wave fronts, at which a second acousto-optical modulation takes place, wherein respective transmitted and diffracted branches are generated by this second acousto-optical modulation not only from the deflected transmitted branch 40TU but also from the deflected diffracted branch 40BU.

Therefore, a transmitted deflected transmitted branch 40TUT and a diffracted deflected transmitted branch 40TUB result from the deflected transmitted branch 40TU due to the second acousto-optical modulation, wherein the transmitted deflected transmitted branch 40TUT propagates with an unchanged direction of propagation in relation to the deflected transmitted branch 40TU along the beam axis 45 whereas the diffracted deflected transmitted branch 40TUB propagates along the bean axis 43 at the angle of diffraction α in relation to the beam axis 45 of the transmitted deflected transmitted branch 40TUT, namely such that an angle bisector between the beam axis 43 of the diffracted deflected transmitted branch 40TUB and the beam axis 45 of the deflected transmitted branch 40TU incident in the second acousto-optical modulator 30b extends parallel to the second direction of propagation 34b of the second sound wave 36B. In this respect, the beam axes 43 and 45 define a second plane of modulation ME2 which, in the simplest case, likewise corresponds to the plane of drawing in FIG. 1.

Furthermore, as a result of the second acousto-optical modulation the deflected diffracted branch 40BU is divided into a transmitted deflected diffracted branch 40BUT, which propagates in the second acousto-optical modulator 30b in continuation of the direction of incidence of the deflected diffracted branch 40BU and thus parallel to the diffracted deflected transmitted branch 40TUB, and a diffracted deflected diffracted branch 40BUB which extends at the angle of diffraction α of the first order in relation to the incident deflected diffracted branch 40BU and thus parallel to the transmitted deflected transmitted branch 40TUT.

In the case of the inventive acousto-optical modulation device 10, the diffracted branch 40B generated in the first acousto-optical modulator 30a by means of the first acousto-optical modulation has a shift in frequency through −F in relation to the incident radiation field 40 on account of the diffraction in a rearward direction in relation to the first sound propagation direction 34a and so proceeding from the fact that the incident radiation field 40 has the frequency $F_o$ the diffracted branch 40B has the frequency $F_o$−F.

The diffracted branch 40B retains this frequency, wherein during the second acousto-optical modulation in the second sound wave field 36B the diffracted deflected diffracted branch 40BUB experiences a further shift in frequency through +F on account of the diffraction as a result of the second acousto-optical modulation when the diffracted deflected diffracted branch 40BUB is diffracted in a forward direction with respect to the second sound propagation direction 34b and so, altogether, the diffracted deflected diffracted branch 40BUB has a frequency of $F_o$−F+F and thus, again, a frequency of $F_o$.

On the other hand, the frequency of the transmitted deflected diffracted branch 40BUT remains and so this has the frequency $F_o$−F.

Since the transmitted branch 40T has not experienced any diffraction during the first acousto-optical modulation in the first acousto-optical modulator 30a, its frequency remains unchanged and so this has the frequency $F_o$. The frequency is also retained during the second acousto-optical modulation in the second acousto-optical modulator 30b when the transmitted deflected transmitted branch 40TUT is formed from the deflected transmitted branch 40TU and so this likewise has the frequency $F_o$.

On the other hand, a shift in frequency takes place during the formation of the diffracted deflected transmitted branch 40TUB within the scope of the second acousto-optical modulation in the second acousto-optical modulator 30b, wherein a diffraction takes place in a rearward direction in relation to the second sound propagation direction 34b and so the diffracted deflected transmitted branch 40TUB has been given a shift in frequency of −F and its frequency is $F_o$−F.

As a result, the transmitted deflected transmitted branch 40TUT and the diffracted deflected diffracted branch 40BUB which propagate parallel to one another have the same frequency and, in addition, propagate relative to one another so as to overlap in essential sections so that these interfere with one another dependent on the relative phase position to one another and form a second radiation field 48 which corresponds in this embodiment to the second exiting radiation field 16.

If the phase positions of the two branches are preferably such that they are displaced through approximately 180° relative to one another, these cancel one another out due to destructive interference when the amplitudes of the two branches 40TUT and 40BUB are the same and the second exiting radiation field 16 has the amplitude 0.

This is the case, for example, when not only during the first acousto-optical modulation in the first acousto-optical modulator 30a but also during the second acousto-optical modulation in the second acousto-optical modulator 30b a respective modulation takes place with a diffraction efficiency of approximately 50%.

Furthermore, the transmitted deflected diffracted branch 40BUT and the diffracted deflected transmitted branch 40TUB also have the same frequency, namely $F_o$−F, since both have resulted on account of a one-time diffraction in a rearward direction in relation to the respective sound propagation direction 34a and 34b so that these two branches 40BUT and 40TUB likewise interact with one another due to interference on account of their essentially superimposed propagation in the same direction and, when the difference in phase between the two is preferably 0, result in a positive interaction. The first radiation field 46 is formed from the branches 40BUT and 40TUB due to constructive interference and this corresponds in this first embodiment to the first exiting radiation field 14 and, in the case of a diffraction efficiency of approximately 50% during both acousto-optical modulations, is at a maximum.

When carrying out the first acousto-optical modulation and the second acousto-optical modulation with the diffraction efficiency of approximately 50% it is thus possible to couple the entering radiation field 12 essentially exclusively into the first exiting radiation field 14 whereas the second exiting radiation field 16 disappears.

If, on the other hand, the sound source 32*a* and 32*b* is switched off in both acousto-optical modulators 30*a* and 30*b*, the respective grating 38*a* and 38*b* of wave fronts disappears in both acousto-optical modulators 30*a* and 30*b* and neither a first acousto-optical modulation nor a second acousto-optical modulation takes place and so the entering radiation field 12 passes through the first acousto-optical modulator 30*a* without any acousto-optical modulation, is deflected by the mirror 50 and passes through the second acousto-optical modulator 30*b* without any acousto-optical modulation and exits as second exiting radiation field 16. As a result, the entering radiation field 12 is, in this case, coupled exclusively into the second exiting radiation field 16.

It is thus possible to couple the entering radiation field 12 alternately either into the first exiting radiation field 14 or the second exiting radiation field 16 either by switching on the sound sources 32*a* and 32*b* and operating the first acousto-optical modulation and the second acousto-optical modulation with a diffraction efficiency of 50% or switching off the sound sources 32*a* and 32*b*.

In all the remaining types of operation of the acousto-optical modulators 30*a* and 30*b* with values of the diffraction efficiency deviating from approximately 50% or also different values of the diffraction efficiency, optional intermediate states can be set between an exclusive coupling of the entering radiation field 12 into one of the exiting radiation fields 14 or 16.

In order to ensure that the two sound sources 32*a* and 32*b* generate sound waves 36*a* and 36*b* with the same frequency, a single frequency generator is preferably provided which controls the two sound sources 32*a* and 32*b*.

In the case of the sound waves generated by the sound sources 32*a* and 32*b*, these can be shear waves or compression waves or mixtures of such waves.

Sound waves 36*a* and 36*b* representing shear waves are preferably generated with the sound sources 32*a* and 32*b* in an isotropic material, for example, quartz glass, in which the gratings 38*a* and 38*b* then result which are responsible for the first acousto-optical modulation and the second acousto-optical modulation.

In the first embodiment illustrated in FIG. 1 it is not absolutely necessary for the first plane of modulation ME1 and the second plane of modulation ME2 to be located in a common plane, namely the plane of drawing. It is just as conceivable for the planes of modulation ME1 and ME2 to extend, for example, at an angle to one another.

The arrangement of the planes of modulation ME1 and ME2 is primarily dependent on how the radiation guide system between the first acousto-optical modulator 30*a* and the second acousto-optical 30*b* is designed and constructed.

If, for example, light guides are used for the radiation guide system 26 instead of the reflectors 50 and 54, the planes of modulation ME1 and ME2 can have any optional alignment relative to one another.

Figure 2:
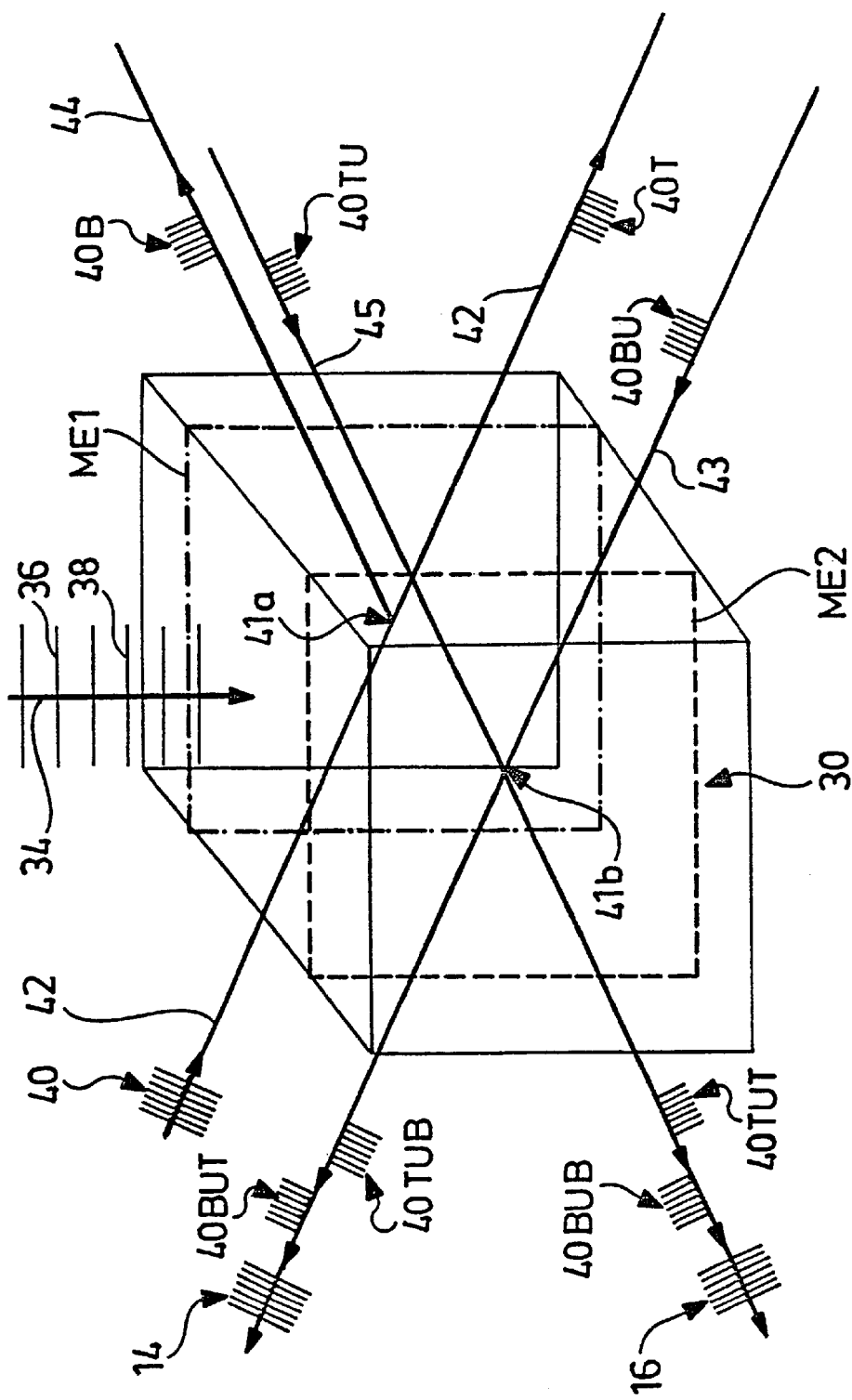
FIG. 2 shows a sectional schematic illustration of a second embodiment of an inventive modulation device.
Figure 3:
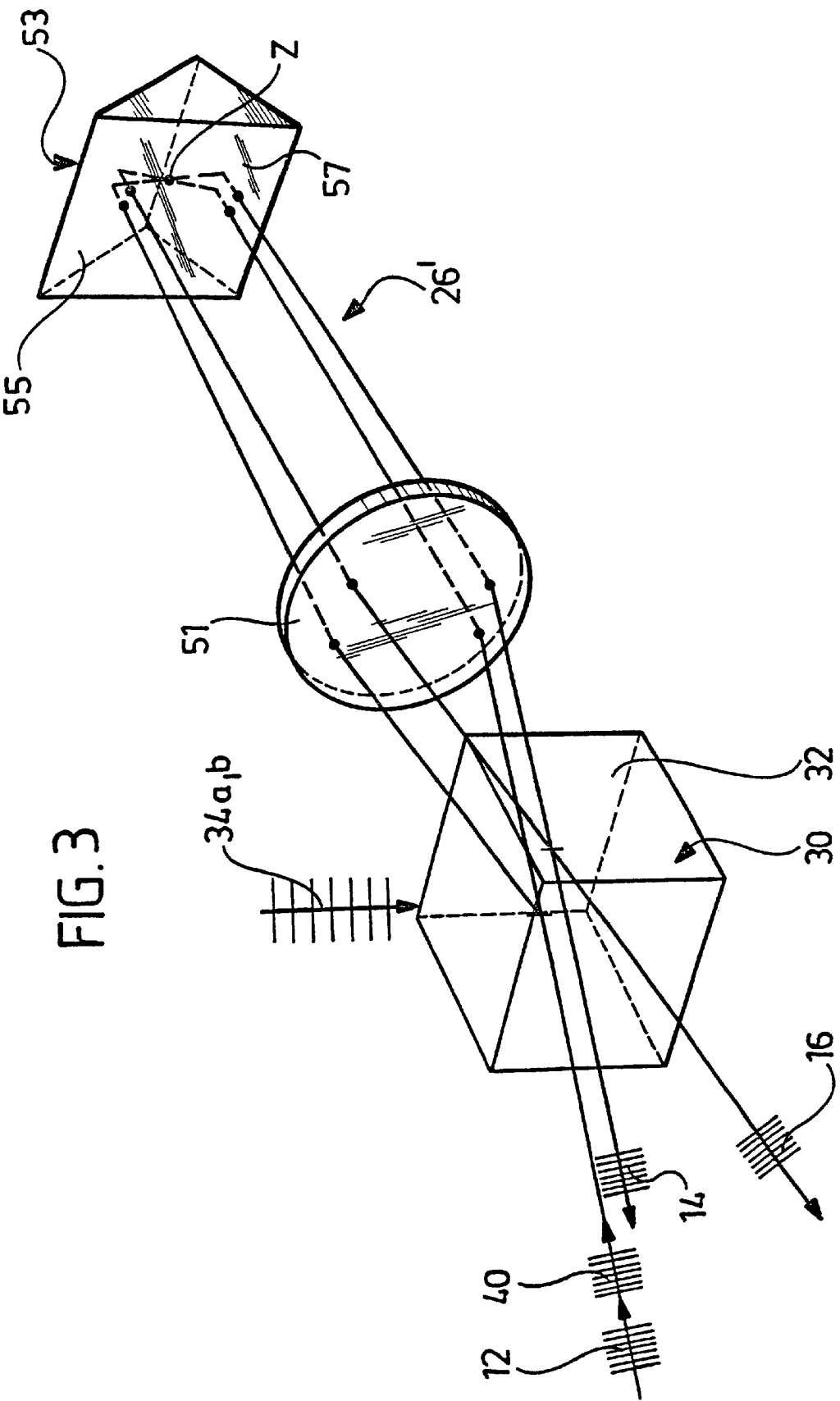
FIG. 3 shows an overall illustration of the second embodiment of the inventive modulation device.

For example, it is provided, as in a second embodiment illustrated in FIGS. 2 and 3, for the first plane of modulation ME1 and the second plane of modulation ME2 to be placed in a single acousto-optical modulator 30 which represents not only the first acousto-optical modulator 30*a* of the first embodiment but also the second acousto-optical modulator 30*b* of the second embodiment. This acousto-optical modulator has a sound wave field 36 passing through it which propagates in a single direction of propagation 34 and the wave fronts of which form a single grating 38 which represents not only the first grating 38*a* but also the second grating 38*b*since both planes of modulation ME1 and ME2 are penetrated by the grating 38.

The diffracted branch 40B, which propagates along the beam axis 44, as well as the transmitted branch 40T, which propagates further in continuation of the beam axis 42, are thus formed by way of diffraction from the radiation field 40 which is incident in the first plane of modulation ME1 and propagates along the beam axis 42. These two branches 40B and 40T are, as illustrated in FIG. 3, returned to the modulator 30 by means of the radiation guide system 26' such that the deflected diffracted branch 40BU and the deflected transmitted branch 40TU propagate towards one another in the second plane of modulation ME2 and on account of the acousto-optical modulation the branches 40BUB and 40TUT, on the one hand, and the branches 40TUB and 40BUT, on the other hand, are then formed which result in the second exiting radiation field 16 and the first exiting radiation field 14, respectively.

Since the sound wave field 36 travelss in the acousto-optical modulator 30 in a single direction of propagation 34 through the medium 32 of the acousto-optical modulator, the radiation guide system 26' is, however, designed such that the angle bisector between the beam axis 45 of the deflected transmitted branch 40TU and the beam axis 43 of the first exiting radiation field extends parallel to the sound propagation direction 34 and, in addition, the diffracted deflected transmitted branch 40TUB results due to diffraction in a rearward direction relative to the sound propagation direction 34 so that, on the one hand, the diffracted deflected transmitted branch 40TUB and the transmitted deflected diffracted branch 40BUT are superimposed to form the first exiting radiation field 14 and, on the other hand, the diffracted deflected diffracted branch 40BUB and the transmitted deflected transmitted branch 40TUT can be superimposed to form the second exiting radiation field 16 with the same frequency, as described in conjunction with the first embodiment.

In order to achieve this, the radiation guide system 26' is designed such that it comprises a lens 51 which deflects the diffracted branch 40B and the transmitted branch 40T such that these intersect at an intermediate point of intersection Z and then intersect again in the junction area 41*b* in the second plane of modulation ME2 with the angle of diffraction of the first order. In order, in addition, to return the branches 40B and 40T from the first plane of modulation ME1 to the second plane of modulation ME2 in the same acousto-optical modulator 30, a deflecting prism 53 is provided which has two mirror surfaces 55 and 57, between which the intermediate point of intersection Z is located.

As for the rest, reference is made in full to the first embodiment with respect to the mode of operation of the second embodiment.

Figure 4:
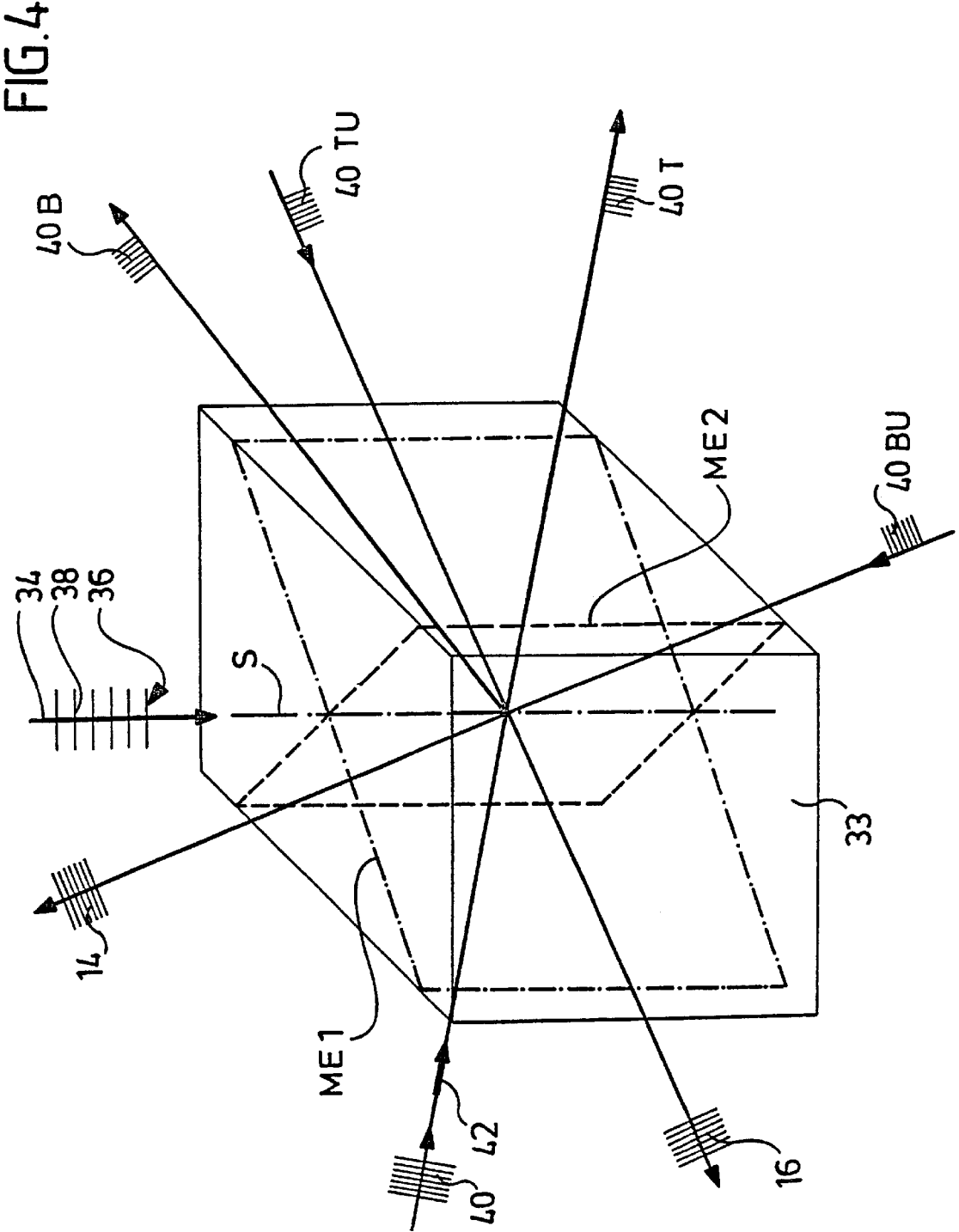
FIG. 4 shows a sectional schematic illustration similar to FIG. 2 of a third embodiment of the inventive modulation device.
Figure 5:
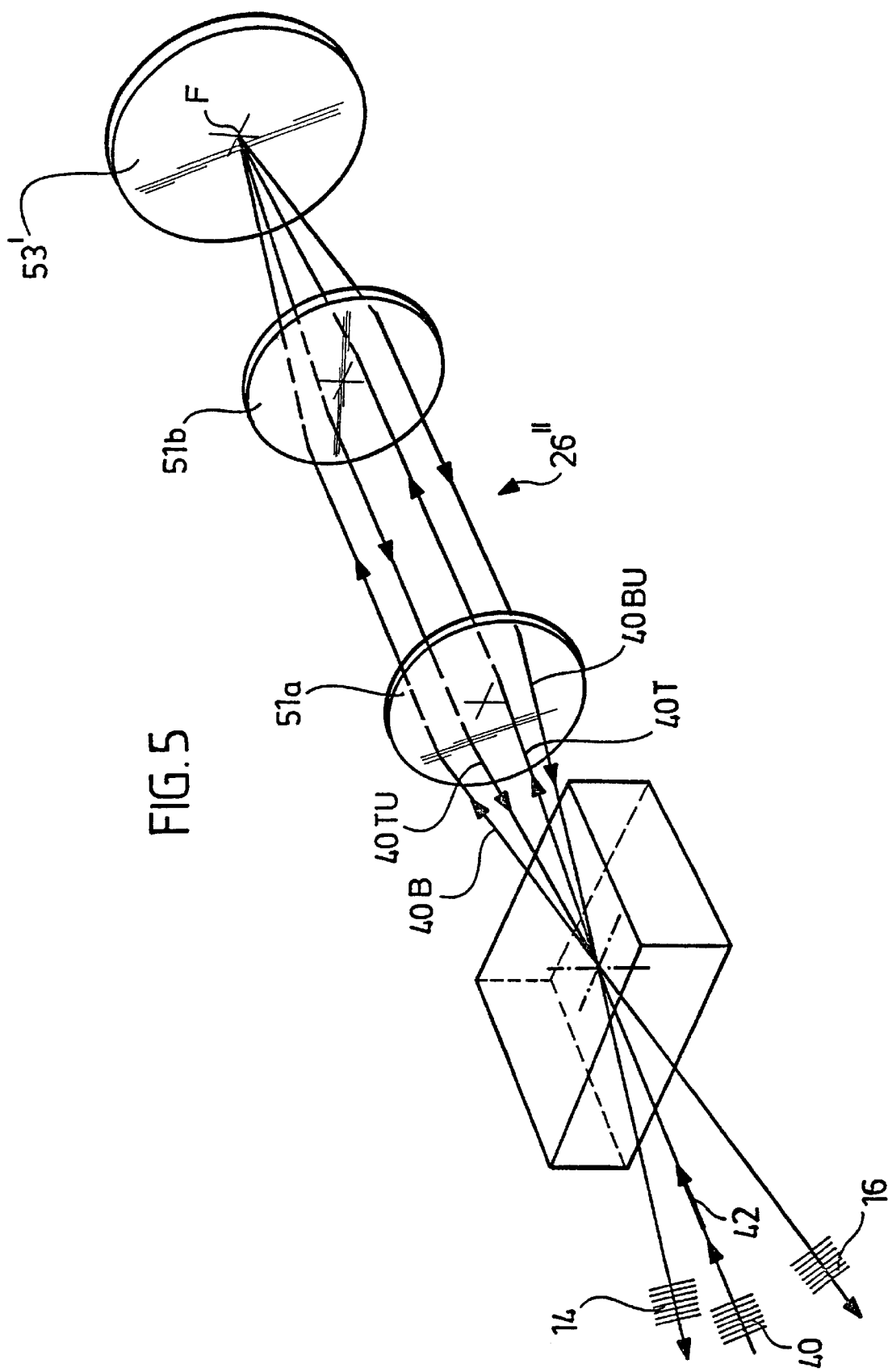
FIG. 5 shows an overall illustration of the third embodiment of the inventive modulation device.

Alternatively to the second embodiment, it is possible in a third embodiment, as illustrated in FIG. 4, to design the planes of modulation ME1 and ME2 as intersecting planes which intersect one another along a line of intersection S which extends essentially parallel to the sound propagation direction 34. Furthermore, as illustrated in FIG. 5, the radiation guide system 26" is thereby designed such that it has a lens 51a and a lens 51b, the common optical axis of which intersects the line of intersection, these lenses first causing the diffracted branch 40B and the transmitted branch 40T to extend, for example, parallel to one another and then deflecting them onto a single reflector 53' to a point of intersection F located on the line of intersection S, wherein the deflected branches 40TU and 40BU, which are located in the second plane of modulation ME2 after passing through the two lenses 51b and 51a, result due to the reflection.

The lenses 51a and 51b preferably form a telescope, the optical axis of which extends not only through the point of intersection F but also through the line of intersection S.

As for the rest, the same divisions into diffracted and transmitted branches take place in the first plane of modulation ME1 and in the second plane of modulation ME2 as those already described in conjunction with the first and second embodiments and so in this respect reference can be made in full to the first and second embodiments.

Figure 6:
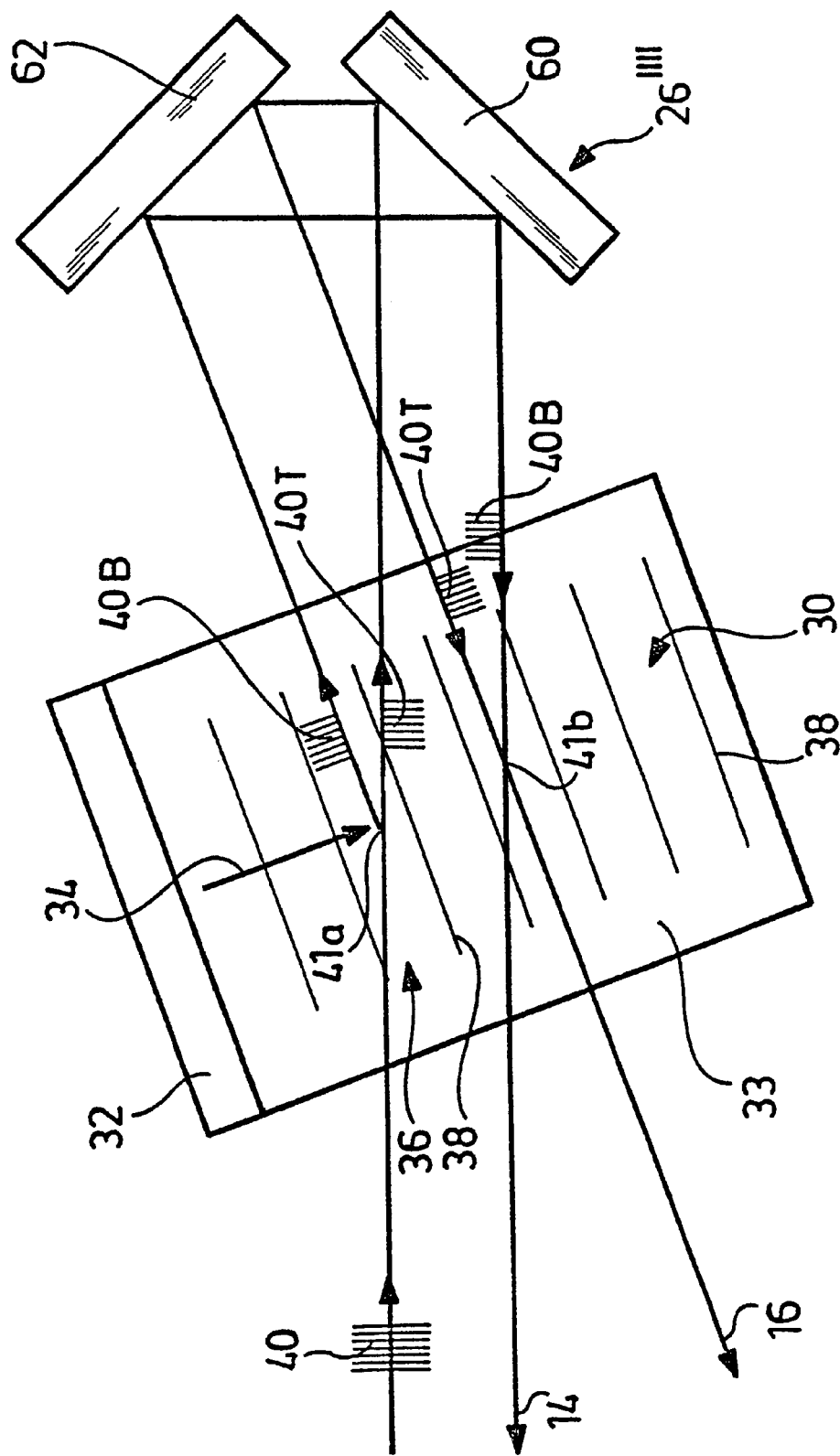
FIG. 6 shows a schematic sectional illustration of a fourth embodiment similar to FIG. 1 of the inventive modulation device.

In a fourth embodiment, illustrated in FIG. 6, the first plane of modulation ME1 and the second plane of modulation ME2 coincide, in addition, and are both located in the plane of drawing, wherein the first and second junction areas 41a and 41b, respectively, are, however, still arranged so as to be separated, namely offset relative to one another in the sound propagation direction 34.

In contrast to the radiation guide systems 26, 26' and 26" described thus far, the radiation guide system 26'" according to the fourth embodiment is provided with a first reflector 60 and a second reflector 62 which return the transmitted branch 40T of the incident radiation field 40 into the acousto-optical modulator 30 as deflected transmitted branch 40TU such that this deflected transmitted branch 40TU enters the acousto-optical modulator parallel to the diffracted branch 40B but at a distance from it and thus spatially separated from it.

Furthermore, the diffracted branch 40B is deflected by the two reflectors 60 and 62 such that it enters the acousto-optical modulator as a deflected diffracted branch 40BU extending towards the deflected transmitted branch 40TU at the angle of diffraction of the first order α but extends at a distance and parallel to the transmitted branch 40T so that the two deflected branches 40TU and 40BU intersect one another in the second junction area 40b of the acousto-optical modulator 30 which is likewise arranged at a distance from the junction area 41a in the acousto-optical modulator 30.

The beam axis of the resulting first exiting radiation field 14 is thus offset in relation to the beam axis of the incident radiation field 40 and, in addition, the beam axis of the second exiting radiation field 16 is also aligned such that this extends at the angle of diffraction of the first order α in relation to the first exiting radiation field 14.

If the acousto-optical modulator 30 now operates with a diffraction efficiency of essentially 0%, no diffraction of the incident radiation field 40 results and this is merely reflected by the reflectors 60 and 62, forms the deflected transmitted branch 40TU and then the second exiting radiation field 16 which merely comprises the transmitted deflected transmitted branch 40TUT.

Furthermore, the first exiting radiation field has the intensity 0 on account of no diffraction occurring.

If, however, the acousto-optical modulator 30 is operated with a diffraction efficiency of essentially 50%, the first exiting radiation field 14 results with a maximum intensity on account of the diffraction and transmission of the returned branches 40TU and 40BU in the acousto-optical modulator 30 whereas the second radiation field 16 has the intensity 0 on account of interference, as explained in detail in conjunction with the first embodiment.

In the fourth embodiment, the reflectors 60 and 62 are, for example, preferably arranged such that the optical paths for the branches 40B and 40T from the first junction area 41a to the second junction area 41b are either of the same length or have such a path difference that the desired phase difference between the branches, which are generated during the second acousto-optical modulation and are intended to result, on the one hand, in the first exiting radiation field 14 or the second radiation field 16, assumes the required values, such as described in conjunction with the first embodiment, i.e. the branches 40TUT and 40BUB are intended to cancel one another out on account of the phase difference with an amplitude of both branches different to 0 whereas the phase difference between the branches 40BUT and 40TUB is intended to be essentially 0.

In comparison with the second and third embodiments and apart from the advantage that only one single acousto-optical modulator is required for the first acousto-optical modulation and the second acousto-optical modulation, the fourth embodiment according to FIG. 6 has the additional advantage that the resources required for adjusting the radiation guide system 26'" in comparison with the radiation guide systems 26, 26' and 26" described above are simplified further due to the consolidation of the first plane of modulation ME1 and the second plane of modulation ME2 since all the branches 40B and 40T as well as 40TU and 40BU extend in a common plane.

As for the rest, reference is made to the fundamental explanations concerning the first embodiment.

In the second, third and fourth embodiments the planes of modulation ME1 and ME2 can also be arranged such that they coincide.

For this purpose, the optical elements of the radiation return systems 26', 26" and 26'" are accordingly to be arranged differently.

In addition, the first radiation field 46 can also be placed due to alteration of the optical elements of the radiation return systems 26', 26" and 26'" such that its beam axis coincides approximately with that of the incident radiation field 40.

Figure 7:
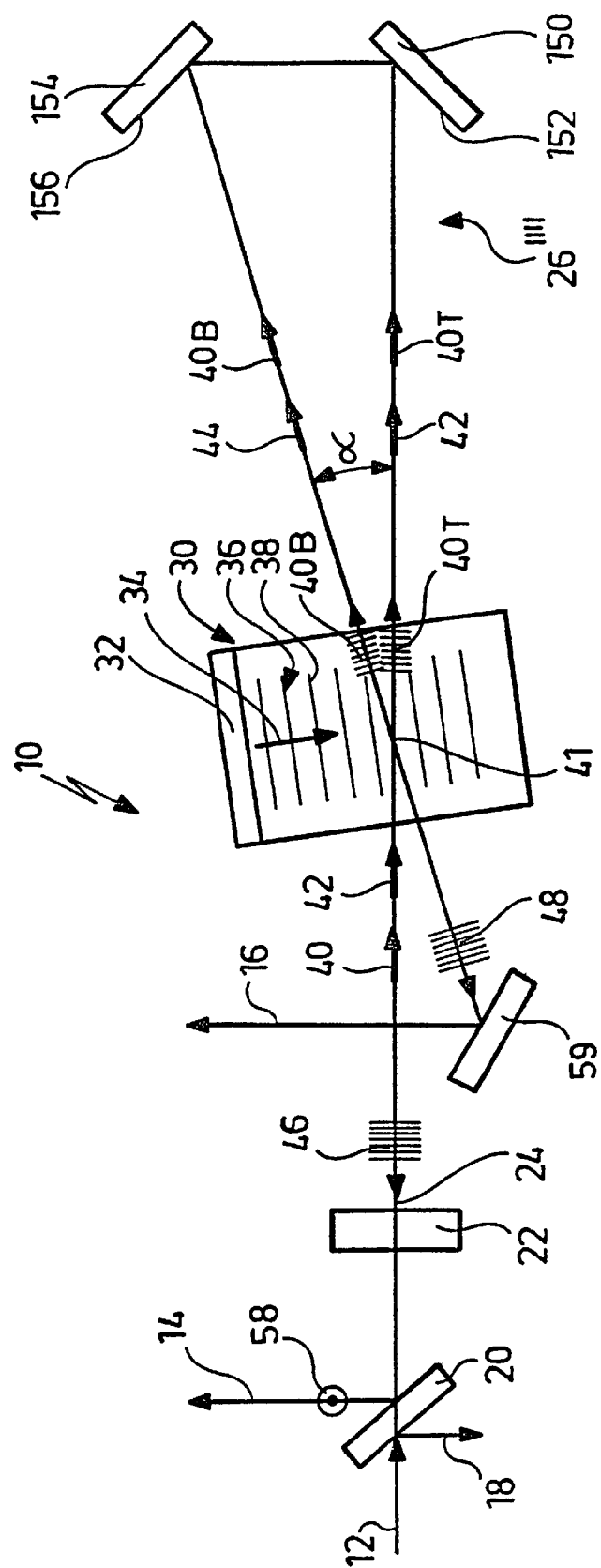
FIG. 7 shows an illustration of a fifth embodiment of an inventive modulation device.
Figure 8:
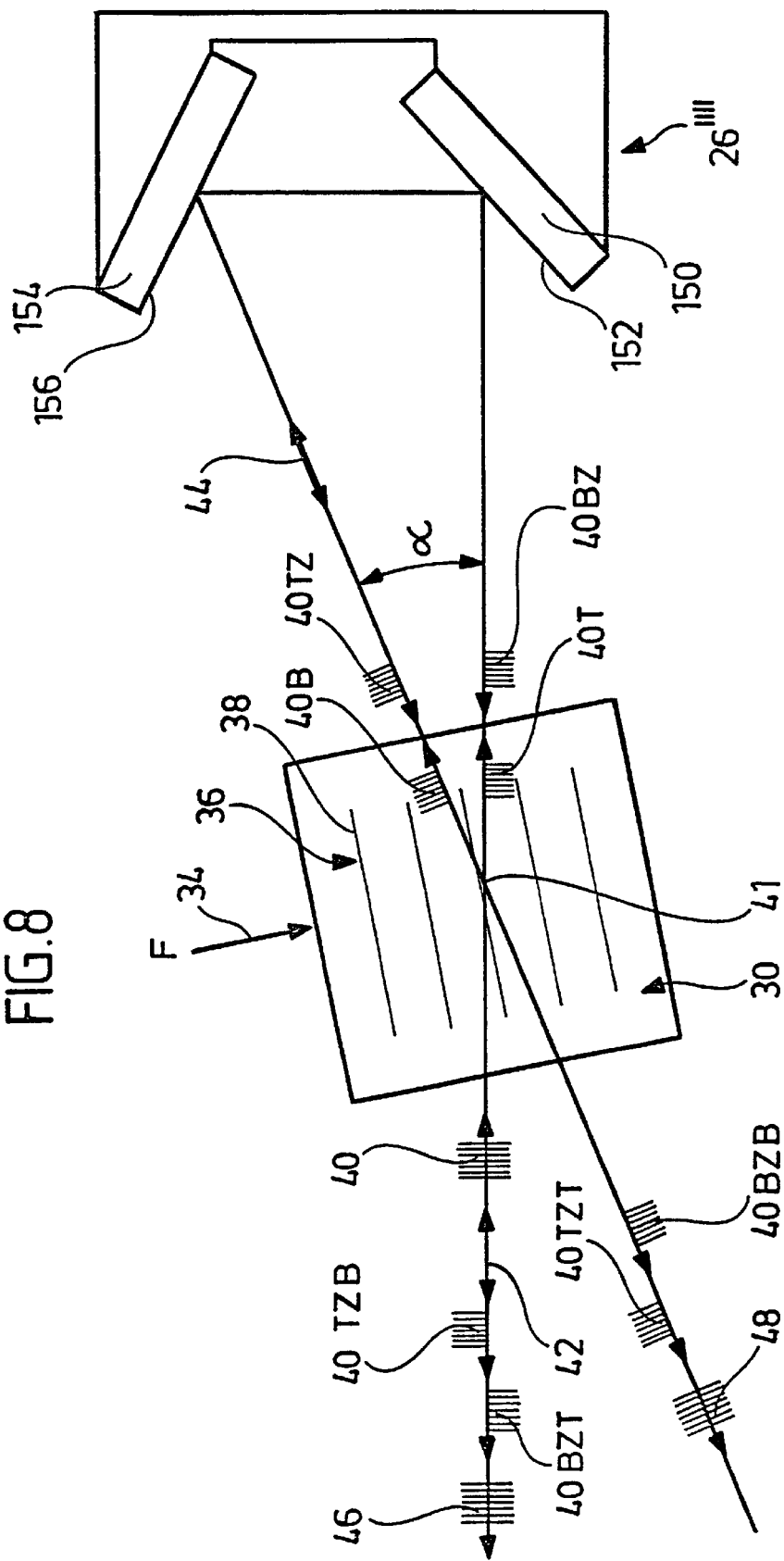
FIG. 8 shows a sectional enlarged illustration of the fifth embodiment in the area of the acousto-optical modulator with the radiation return system.

In a fifth embodiment, illustrated in FIGS. 7 and 8, the radiation guide system 26"" is improved even further with respect to the path for the individual branches 40B and 40T and so the optical path for the branches 40B and 40T is the same.

In detail, the fifth embodiment according to FIGS. 7 and 8 operates as follows.

The entering radiation field 12 preferably has a direction of polarization 18 located in the plane of drawing illustrated in FIG. 1 and at least that part polarized in this direction of polarization 18 passes through a polarizer 20, penetrates a polarization-influencing element 22 and propagates in this element in entry direction 24 along the beam axis 42 as far as the radiation guide system 26"" designed as a radiation return system which interacts with the acousto-optical modulator 30 provided between the polarization-influencing element 22 and the radiation return system 26.

The radiation field 40 incident in the acousto-optical modulator 30 is formed from the entering radiation field 12 passing through the polarization-influencing element 22, propagates along the beam axis 42 and impinges on the grating 38 consisting of sound wave fronts after entering the acousto-optical modulator 30. As a result, the incident radiation field 40 is divided into a transmitted branch 40T propagating further along the beam axis 42 proceeding from the junction area 41 as well as the branch 40B diffracted in the first order which is diffracted in relation to the direction 42 through the angle of diffraction α and propagates along the beam axis 44, these two branches propagating further within the acousto-optical modulator 30 in an exiting direction towards the radiation return system 26, wherein the refraction at the boundary surfaces of the acousto-optical modulator is disregarded for reasons of graphicness.

As illustrated in FIGS. 7 and 8, the radiation return system 26″″ comprises a first mirror 150 with a first mirror surface 152 as well as a second mirror 154 with a second mirror surface 156, wherein the mirror surfaces 152, 156 are arranged such that the transmitted branch 40T propagating in the direction of the radiation return system 26″″ impinges on the mirror surface 152 and the diffracted branch 40B propagating in the direction of the radiation return system 26″″ impinges on the second mirror surface 156.

Furthermore, the mirror surfaces 152, 156 are arranged relative to one another such that the transmitted branch 40T is reflected by the first mirror surface 152 onto the second mirror surface 156 and is reflected by this back to the acousto-optical modulator 30 and again propagates in the direction of the acousto-optical modulator 30 in the form of a deflected transmitted branch, in this case designated as returned transmitted branch 40TZ, wherein the beam axis of the returned transmitted branch 40TZ essentially coincides with the beam axis 44 so that the diffracted branch 40B and the returned transmitted branch 40TZ extend essentially along the beam axis 44 but with different, in particular, opposite directions of propagation.

Moreover, the diffracted branch 40B is reflected by the second mirror surface 156 onto the first mirror surface 152 such that the deflected branch, in this case designated as returned diffracted branch 40BZ, propagates along a beam axis essentially coinciding with the beam axis 42, but in a direction extending oppositely to the transmitted branch 40T, and likewise enters the acousto-optical modulator 30.

The radiation return system 26″″ thus represents a special case of the radiation return system 26‴, with which the diffracted branch 40B and the transmitted branch 40T pass along the same optical paths from the first junction area 41a to the second junction area 41b.

The second acousto-optical modulation now takes place in the acousto-optical modulator 30, likewise caused by the diffraction grating 38 and thus the returned transmitted branch 40TZ is divided into the branch 40TZT propagating further approximately parallel to the beam axis 44 and passing through the acousto-optical modulator 30 in transmission as well as the diffracted branch 40TZB which propagates in the opposite direction to the incident radiation field 40 approximately parallel to the beam axis 42, preferably coincident with it, in the direction of the polarization-influencing element 22 and exits from the acousto-optical modulator 30.

The returned diffracted branch 40BZ is divided in the same way into the branch 40BZT which passes through the acousto-optical modulator 30 in transmission and propagates approximately parallel to the beam axis 42 but in the opposite direction to the transmitted branch 40T and the diffracted branch 40BZB which propagates approximately parallel to the beam axis 44 and exits from the acousto-optical modulator 30.

If, in addition, the phases of the branches of the radiation fields are considered, this results in ratios analogous to those of an anti-resonant ring interferometer, which is described in the article of E. Siegman in IEEE Journal of Quantum Electronics, February 1973, pages 247 to 250, in the case of a diffraction efficiency of 50% between the respectively transmitted branch 40T and the diffracted branch 40B of the first order and these ratios lead to the fact that the "reflectivity" can be 100%, i.e. the branches 40TZT and 40BZB forming a second radiation field 48 exiting from the modulation device 10 can cancel one another out due to destructive interference whereas the branches 40BZT and 40TZB forming the returning first radiation field 46 exiting from the modulation device can comprise essentially the entire power of the incident radiation field 40 due to constructive interference.

If, on the other hand, no grating 38 is present in the acousto-optical modulator 30, the entire incident radiation field 40 exits in the diffraction direction of the first order 44 in the form of the second radiation field 48 comprising, in this case, only the branch 40TZT resulting due to reflection since no diffraction whatsoever occurs.

In all the intermediate states of the diffraction efficiency between 0% and 50% the intensity of the incident radiation field 40 is divided between the different branches and thus between the returning first radiation field 46 and the second radiation field 48. An analogous division into different branches is also obtained in the case of diffraction efficiencies between 100% and 50%.

The returning first radiation field 46, as illustrated in FIG. 8, now passes through the polarization-influencing element 22 again and impinges on the polarizer 20.

The phase-influencing element 22 is preferably designed such that it turns a radiation field passing through it through a total of 90° in respectively opposite directions when the radiation field passes through it twice so that the direction of polarization 18 of the entering radiation field 12 is turned through 90° when it passes through the phase-influencing element 22 twice and the returning first radiation field 46 has a direction of polarization 58 which extends at right angles to the direction of polarization 18. If this first exiting radiation field 14 impinges on the polarizer 20, it is reflected by it since it cannot pass through it. As a result, a separation takes place at the polarizer 20 between the entering radiation field 12, which passes through it with the direction of polarization 18, and the first exiting radiation field 14 which is reflected by it in the direction of polarization 58 extending at right angles thereto.

Moreover, the second exiting radiation field 16 is formed from the second radiation field 48, which exits from the acousto-optical modulator 30 at the angle α of the diffraction of the first order in relation to the first radiation field 46 and the second exiting radiation field is reflected by a mirror 49, for example, such that it extends approximately parallel to the first exiting radiation field 14.

As a result, it is possible in the case of the inventive modulator unit 10 according to the fifth embodiment to couple the entering radiation field 12 into the first exiting radiation field 14 or the second exiting radiation field 16 or partially into both depending on how the acousto-optical modulator 30 is operated.

As for the rest, reference is made to the explanations concerning the first embodiment.

Figure 9:
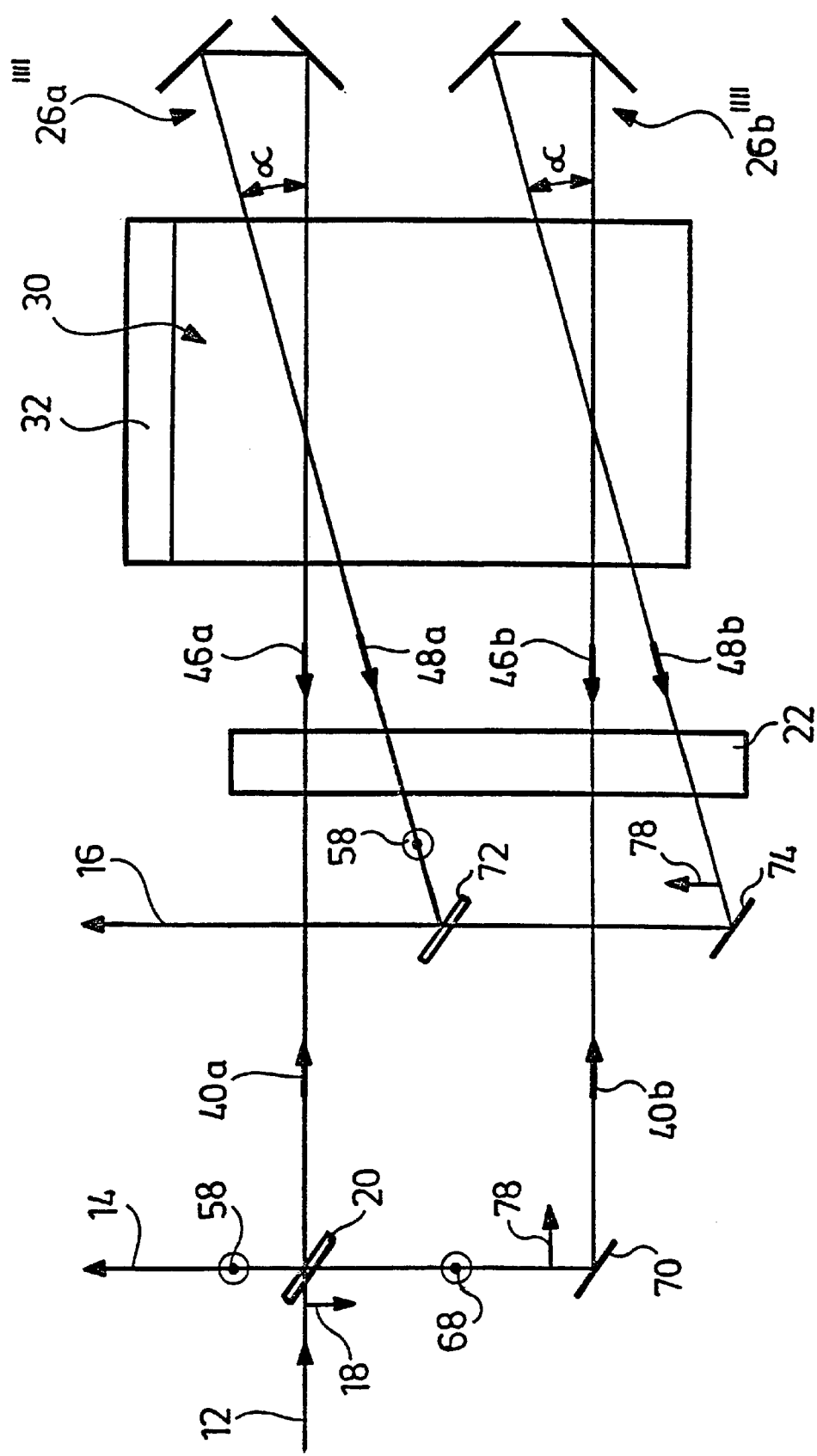
FIG. 9 shows an illustration of a first variation of the fifth embodiment of the inventive modulation device.

In a first variation of the fifth embodiment, illustrated in FIG. 9, the procedure according to the first embodiment illustrated in FIGS. 7 and 8 is carried out twice so that unpolarized light in the entering radiation field 12 can also be coupled completely into either the first exiting radiation field 14 or the second exiting radiation field 16.

For this purpose, the light polarized at right angles to the direction of polarization 18 in a direction of polarization 68 is reflected by the polarizer 20 onto a reflector 70 which reflects this in the form of an incident radiation field 40 in the direction of the acousto-optical modulator 30.

As a result, two incident radiation fields 40a and 40b propagate in the direction of the acousto-optical modulator 30, wherein the incident radiation field 40a has light of the direction of polarization 18 whereas the incident radiation field 40b has light of the direction of polarization 68.

The two incident radiation fields 40a and 40b propagate parallel to one another but at a distance from one another and pass through the polarization-influencing element 22 on their way to the acousto-optical modulator 30. Two radiation return systems 26a"" and 26b"" are associated with the acousto-optical modulator 30, wherein the radiation return system 26a"" returns the branches formed from the incident radiation field 40a whereas the radiation return system 26b"" acts on the branches formed from the incident radiation field 40b so that a first radiation field 46a and a first radiation field 46b, respectively, exit from the acousto-optical modulator 30, wherein these return in the direction of the respective incident radiation field 40a or 40b as well as a second radiation field 48a and 48bwhich extend at the angle of diffraction of the first order a in relation to the respective first radiation field 46a or 46b.

The first radiation fields 46a and 46b, respectively, each pass again through the polarization-influencing element 22, with the effect that a rotation of polarization takes place through 90° with an, altogether, two-time passage through the polarization-influencing element 22 so that the first radiation field 46a is reflected by the polarizer 20 on account of the direction of polarization 58 turned through 90° in relation to the direction of polarization. Furthermore, the direction of polarization of the first radiation field 46b is also turned through 90° so that this has the direction of polarization 78 which is at right angles to the direction of polarization 68 and thus the first radiation field 46b passes through the polarizer 20 after reflection by the reflector 70 and is superimposed with the first radiation field 46a and thereby forms the first exiting radiation field 14.

In the same way, the second radiation fields 48a, 48bpass through the polarization-influencing element 22 again, wherein each of them is turned altogether through 90° when passing twice through the polarization-influencing element 22.

This leads to the second radiation field 48a likewise having the direction of polarization 58 and being reflected by a polarizer 72 aligned parallel to the direction of polarization 58. The second radiation field 48bhas, on the other hand, the direction of polarization 78 after passing twice through the polarization-influencing element 22 and so the second radiation field 48bpasses through the polarizer 72 after reflection at a reflector 74 in the direction of the polarizer 72 and thus the second radiation fields 48a and 48bare added together to form altogether the second exiting radiation field 16.

It is thus possible in the first variation of the fifth embodiment to couple unpolarized radiation as entering radiation field 12 into the first and/or the second exiting radiation field 14, 16.

As for the rest, reference is made to the comments on the first embodiment.

Figure 10:
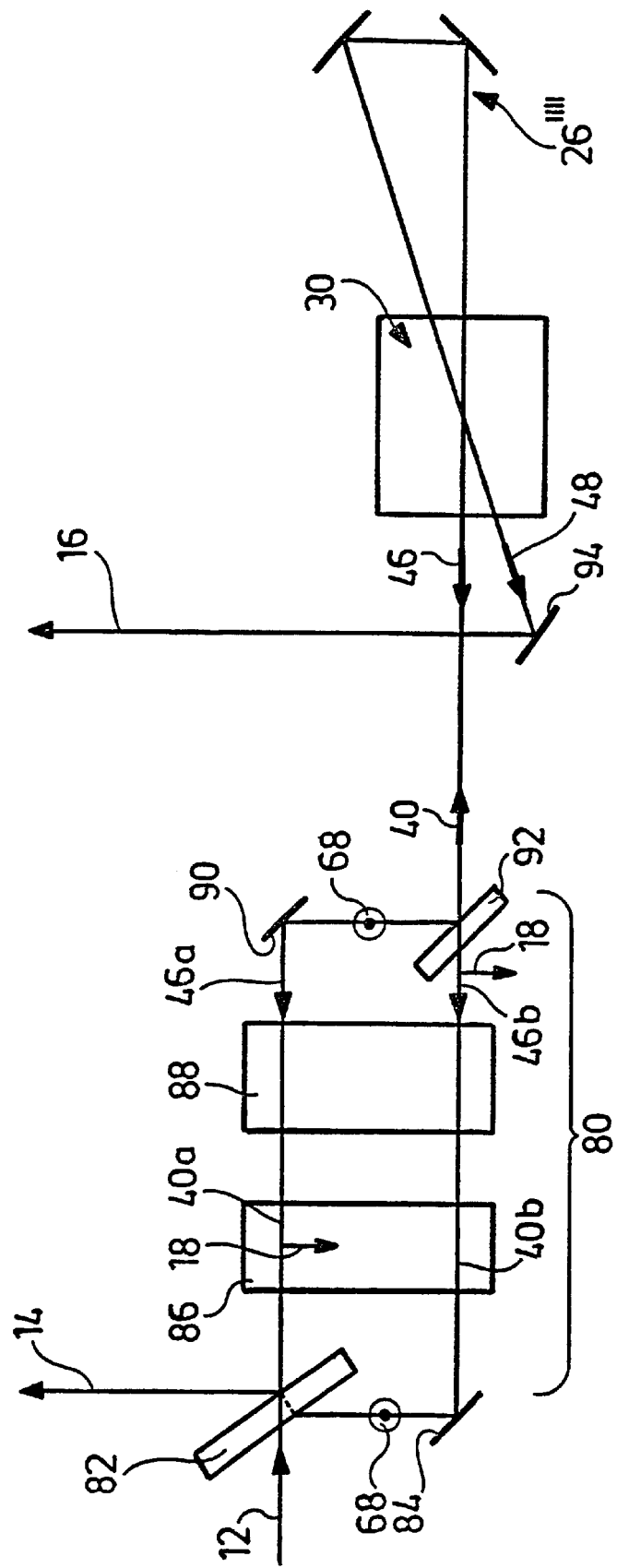
FIG. 10 shows an illustration of a second variation of the fifth embodiment of the inventive modulation device.

In a second variation of the fifth embodiment, illustrated in FIG. 10, the construction is selected in accordance with the first embodiment according to FIGS. 7 and 8.

In contrast to the fifth embodiment, both directions of polarization of the entering radiation field 12 are utilized and so the incident radiation field 40 likewise has both directions of polarization.

The first radiation field 46 propagating in the opposite direction to the incident radiation field 40 is separated from the incident radiation field 40 by an optical diode designated as a whole as 80.

This optical diode comprises, on the one hand, for example, a polarizer 82 which corresponds to the polarizer 20, on which the entering radiation field 12 impinges and which generates an incident radiation field 40a and an incident radiation field 40b similar to the polarizer 20 of the first variation. In this respect, the incident radiation field 40b has the direction of polarization 68 which extends at right angles to the direction of polarization 18 of the incident radiation field 40a.

Furthermore, the incident radiation field 40b is reflected by a reflector 84 and thus guided parallel to the radiation field 40a through a first polarization-influencing element 86 which represents a 45° rotator and a second polarization-influencing element 88 which represents a 45° Faraday rotator. Subsequently, the incident radiation field 40a is reflected by a reflector 90 to a polarizer 92. The direction of polarization 18 has experienced a rotation through 90° due to the two polarization-influencing elements 86 and 88 and thus corresponds to the direction of polarization 68 whereas the direction of polarization 68 has likewise been turned through 90° due to the two polarization-influencing elements and thus corresponds to the direction of polarization 18. If the polarizer 92, on which the incident radiation fields 40a and 40b impinge with directions of polarization turned through 90°, is aligned parallel to the direction of polarization 68, the polarizer 92 reflects the incident radiation field 40a and allows the incident radiation field 40b to pass through unhindered so that both radiation fields 40a and 40b are again added together to form the incident, unpolarized radiation field 40 which impinges on the acousto-optical modulator 30 and in the manner described in conjunction with the first embodiment is divided into the first radiation field 46 and/or the second radiation field 48 depending on the degree of modulation of the acousto-optical modulator 30.

The first radiation field 46 returning in the opposite direction to the incident radiation field 40 enters the optical diode 80 again and has both directions of polarization. That part of the radiation field polarized in accordance with the direction of polarization 18 passes through the polarizer 92 and the radiation field polarized in accordance with the direction of polarization 68 is reflected by the polarizer 92 so that a division of the first radiation field 40 into the radiation fields 46a and 46b again takes place.

Since one of the polarization-influencing elements 86 and 88, for example, the element 88 is a Faraday rotator, this turns the direction of polarization independently of the through beam direction whereas the other polarization-influencing element, for example, the polarization-influencing element 86 is a 45° rotator which changes the direction of polarization dependent on the through beam direction. As a result, a reversal of the through beam direction leads to the first radiation fields 46a and 46b not experiencing any rotation of polarization on aggregate after passing through the two polarization-influencing elements 86 and 88 and thus the first radiation field 46b with the direction of polarization 18 is reflected by the reflector 84 and passes through the polarizer 82 whereas the first radiation field 46a with the direction of polarization 68 is reflected by the reflector 90 and is likewise reflected by the polarizer 82 and both again form, together, the first exiting radiation field 14 which propagates away from the polarizer 82 transversely to the entering radiation field 12.

The second exiting radiation field 16 is formed in a simple manner by way of reflection of the second radiation field 48 exiting from the acousto-optical modulator 30 at a reflector 94.

As for the rest, reference is made to the explanations concerning the first embodiment.

Figure 11:
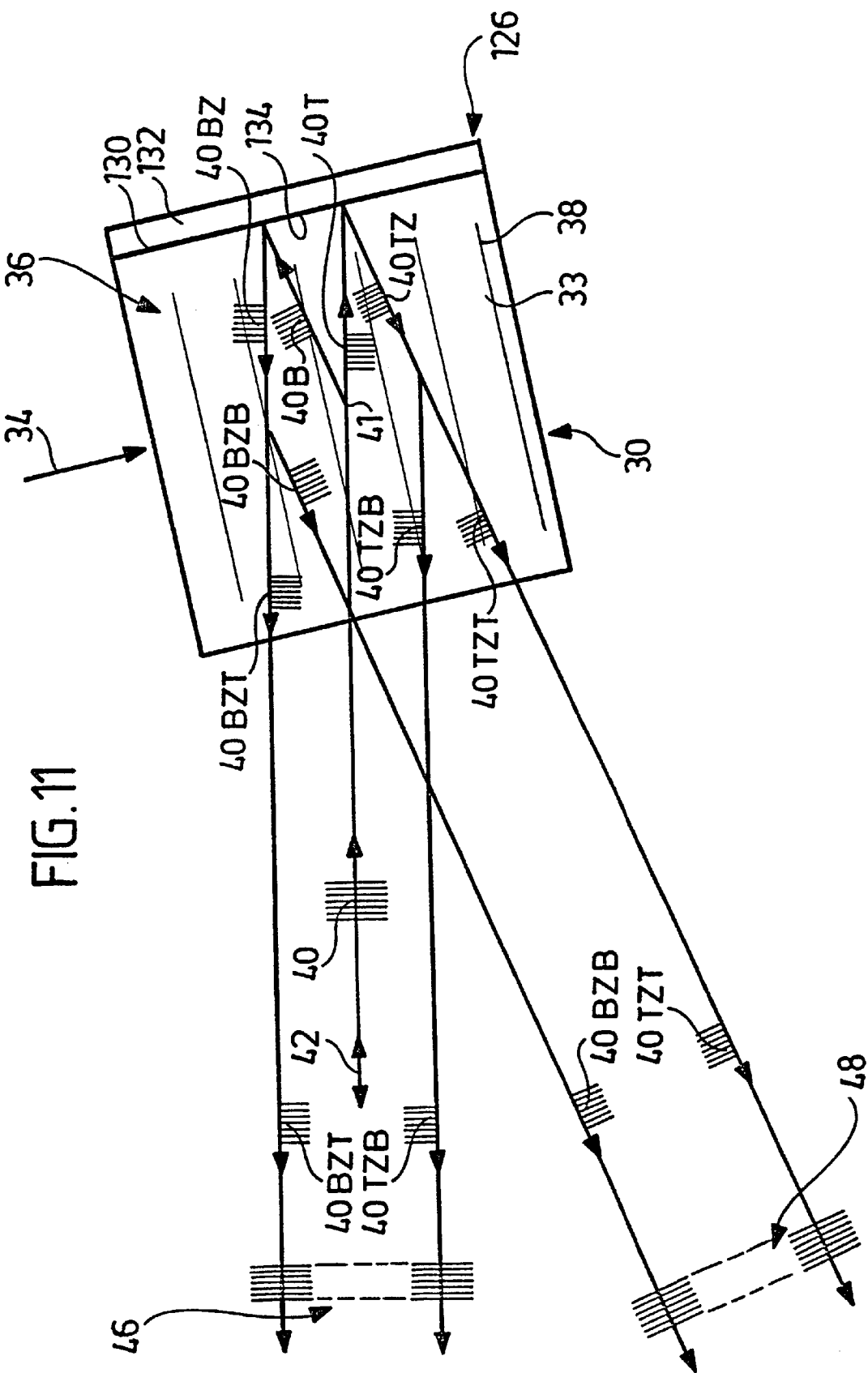
FIG. 11 shows a sectional enlarged illustration of a sixth embodiment of the inventive modulation device.
Figure 12:
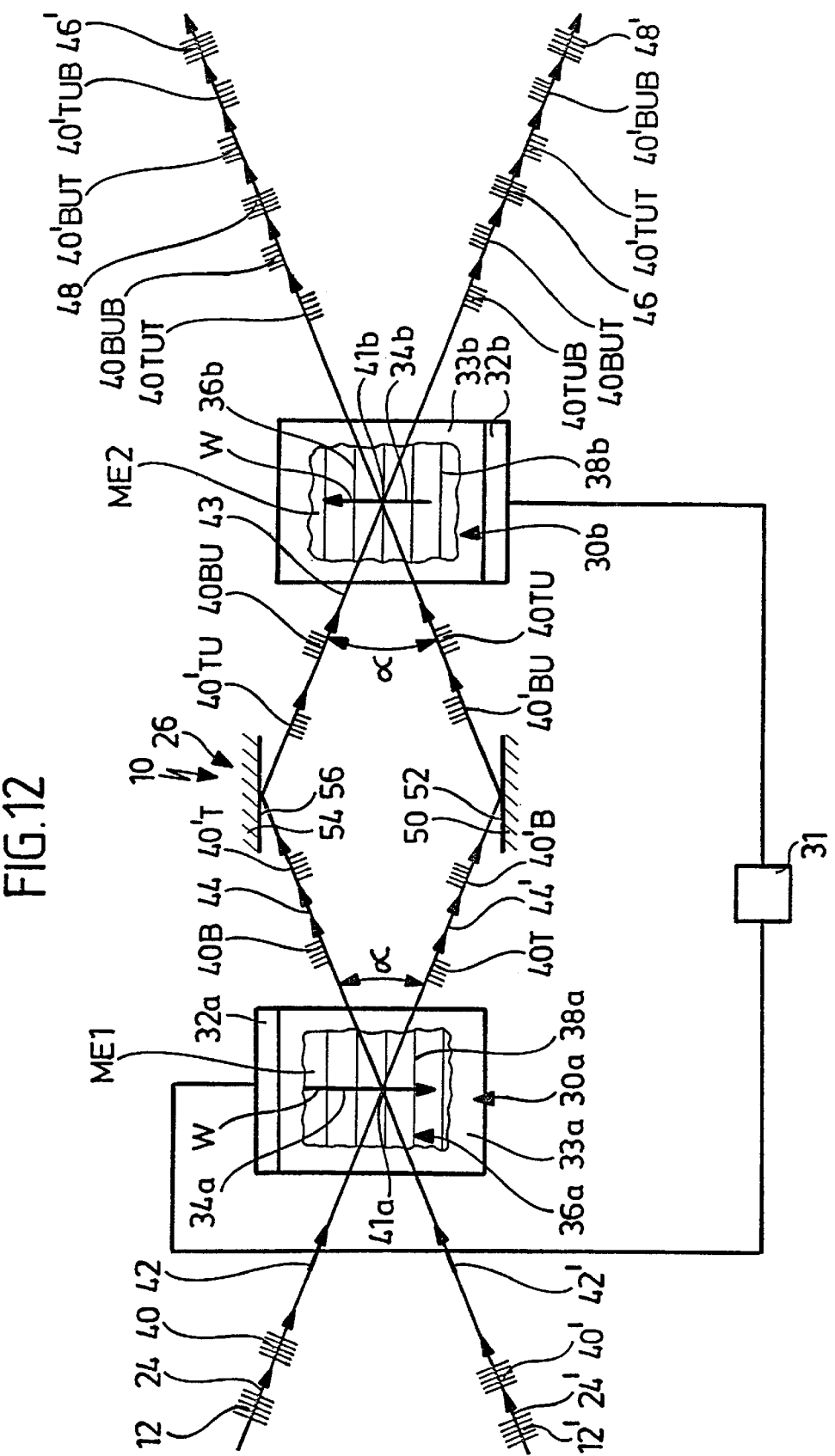
FIG. 12 shows an illustration of a seventh embodiment of the inventive modulation device.

In a sixth embodiment of an inventive modulation device, illustrated in detail in FIG. 11, an acousto-optical modulator 30 is provided which is designed and operates in the same way as in the second to fifth embodiments.

In contrast to the fifth embodiment, the radiation return system 126 is designed in the simplest case as a reflector which is formed by a reflecting layer 132 arranged on a side surface 130 of the acousto-optical modulator 30 on the exit side for the incident radiation field 40 and has a reflector surface 134 which rests directly on the side surface 130 of the acousto-optical modulator 30 and thus essentially coincides with it.

As illustrated in FIG. 11, the incident radiation field 40 is likewise divided within the acousto-optical modulator 30 into a transmitted branch 40T and a diffracted branch 40B. The reflection of the transmitted branch 40T at the reflector surface 134 leads to the returned transmitted branch 40TZ which in this case, however, no longer propagates in the acousto-optical modulator 30 such that its beam axis coincides with that of the diffracted branch 40B but rather the beam axis of the branch 40TZ extends only parallel to that of the diffracted branch 40B.

In the same way, a reflection of the diffracted branch 40B takes place, thus forming a returned diffracted branch 40BZ which likewise no longer propagates in the acousto-optical modulator 30 with a beam axis which coincides with the beam axis of the transmitted branch 40T but rather extends only parallel to the beam axis of the transmitted branch 40T.

In the same way as in the preceding embodiments, the returned branches 40TZ and 40BZ experience a division into two branches again during the first acousto-optical modulation, namely into a diffracted and a transmitted branch. The branch 40TZ results during the second acousto-optical modulation in the branch 40TZB which propagates parallel to the beam axis 42 of the incident radiation field 40 but in the opposite direction to it and exits from the acousto-optical modulator 30 as well as the branch 40TZT which propagates parallel to the beam axis 44 of the diffracted branch 40B and exits in this direction from the acousto-optical modulator 30.

In the same way, the returned diffracted branch 40BZ is divided during the second acousto-optical modulation into a branch 40BZB propagating parallel to the beam axis of the diffracted branch 40B and a branch 40BZT which propagates parallel to the beam axis 42 but in the opposite direction to the incident radiation field 40. The two branches 40BZT and 40TZB result in the returning first radiation field 46 and the two branches 40TZT and 40BZB in the second radiation field 48 coupled out, in the same way as in the fifth embodiment, wherein the branches 40TZT and 40BZB as well as 40BZT and 40TZB are, however, offset slightly in relation to one another transversely to their beam axes but this is unimportant to the extent that the branches can still interact with one another by way of interference and so a complete reflection of the incident radiation field 40 into the radiation field 46 which is reflected back and propagates in the opposite direction to it likewise takes place at a diffraction efficiency of 50%.

When the planes of modulation ME1 and ME2 and also the first and second junction areas 41a, 41b essentially coincide in the sixth embodiment, as well, the entering radiation field 12 is separated from the first exiting radiation field 14 in the same way as that described in conjunction with the fifth embodiment in FIG. 7 or 8 and so reference is made in full to the comments hereon.

It is, however, also possible, as described for the third embodiment according to FIGS. 4 and 5, to operate with intersecting planes of modulation ME1 and ME2, wherein the line of intersection S is then preferably located in the reflector surface 134.

As for the rest, reference is made to the explanations concerning the first embodiment.

In a seventh embodiment of an inventive modulation device which is based for the sake of simplicity on the first embodiment, not only the entering radiation field 12 is provided but a further entering radiation field 12' which is incident in the first plane of modulation ME1 with an entry direction 24' at the angle of diffraction of the first order and forms an incident radiation field 40' which likewise propagates with its beam axis 42' at the angle of diffraction of the first order in relation to the beam axis 42 in the first plane of modulation ME1 and thus intersects the beam axis 42 in the first junction area 41a.

A transmitted branch 40'T and a diffracted branch 40'B thus result due to diffraction of the incident radiation field 40' in addition to the branches 40B and 40T already explained in conjunction with the first embodiment, wherein the transmitted branch 40'T propagates with its beam axis such that this extends approximately parallel, preferably coincident with the beam axis 44 of the diffracted branch 40B whereas the diffracted branch 40'B propagates such that its beam axis 44' extends approximately parallel, preferably coincident with the beam axis 42.

The branches 40'TU and 40'BU are formed due to reflection at the mirror surfaces 52 and 56 and these branches generate in the second plane of modulation ME2, likewise due to diffraction again, the branches 40'BUT and 40'TUB, on the one hand, which result in the first radiation field 46' which propagates approximately with the same alignment of the beam axis as the second radiation field 48.

On the other hand, the branches 40'TUT and 40'BUB are generated which result in the second radiation field 48' which propagates essentially with a beam axis which coincides with that of the first radiation field 46.

With respect to the details, reference can be made in full to the explanations concerning the first embodiment in conjunction with the incident radiation field 40, wherein a diffraction does, however, take place during the first acousto-optical modulation in a forward direction so that the diffracted branch 40'B has the frequency $F_o+F$ and a diffraction also takes place in a forward direction during the second acousto-optical modulation for generating the branch 40'TUB so that both branches 40BUT and 40'TUB have the frequency $F_o+F$ and thus have a uniform shift in frequency but by the frequency $+F$ and not, as in the first embodiment, by the frequency $-F$.

In the case of the branch 40'BUB the shift in frequency is again canceled out due to the fact that a diffraction takes place one time in a forward direction and the second time a diffraction in a rearward direction, analogous to the considerations in the case of the first embodiment.

In the seventh embodiment it is now possible to use the inventive modulation device either for the entering radiation field 12 or the entering radiation field 12' and to generate either the radiation fields 46 and 48 or the radiation fields 46' and 48' in accordance with the activation of the acousto-optical modulators 30*a* and 30*b*, wherein it is also possible to switch over between the radiation fields 46 and 48 or 46' and 48' in the manner already described in conjunction with the first embodiment.

In addition, it is, however, also possible in the case of the seventh embodiment of the inventive modulation device to operate with both entering radiation fields 12 and 12' and not only switch over between the radiation fields 46 and 48 or 46' and 48' but rather to also superimpose the radiation field 46' on the radiation field 48 or the radiation field 48' on the radiation field 46.

As a result, the laser radiation of two lasers can, for example, be superimposed depending on the diffraction efficiency, with which the acousto-optical modulators 30*a* and 30*b* are operated.

The same operating modalities which have been explained in conjunction with the seventh embodiment based on the explanations concerning the first embodiment may also be realized with the remaining embodiments of the inventive modulation device described above, wherein the preceding explanations concerning the seventh embodiment can be used analogously for the remaining embodiments.

Figure 13:
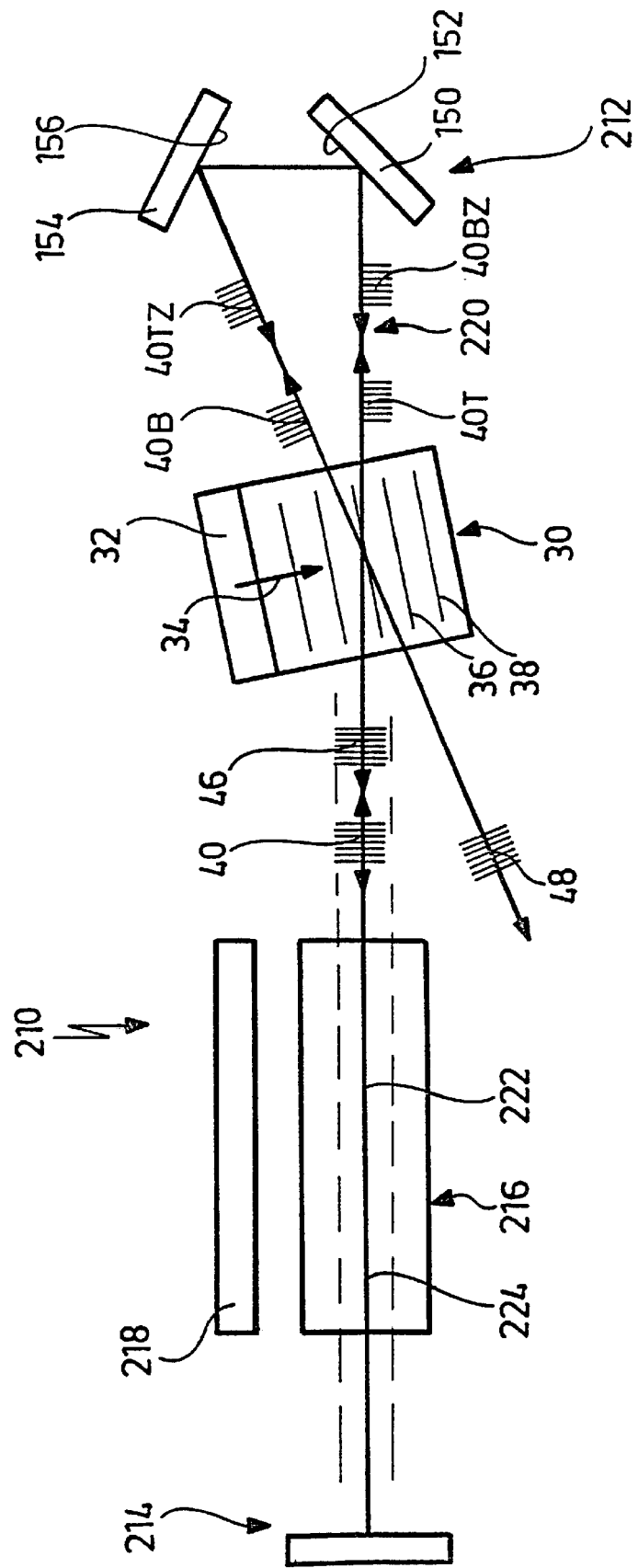
FIG. 13 shows a schematic illustration of a first embodiment of a laser amplifying system with an inventive modulation device integrated therein.

A first embodiment of an inventive laser amplifying system, illustrated in FIG. 13, comprises a feedback amplifier designed as a resonator 210 and having a first amplifying radiation return system 212 and a second amplifying radiation return system 214. Furthermore, a laser-active medium 216 is provided in the resonator 210 and is pumped, for example, by a pumping light source 218.

An optical system with feedback of the radiation fields is considered as a resonator within the meaning of the present invention, wherein a shift in the frequency of the radiation field linked to the feedback is also admissible. The term resonator is not, therefore, limited to resonance conditions which result from the frequency-selective multiple beam interference, as is known from Fabry-Perrot resonators or ring resonators.

This definition of the resonator also covers, for example, the operation on the basis of a regenerative amplifier in that a radiation field coupled in from outside or also the internal spontaneous emission is amplified in a limited number of passes, wherein the number of passes is limited either by switching on the feedback or, however, by the above-mentioned shift in frequency in conjunction with the frequency-dependence of the amplification or the losses.

An optically active volume area 220 extends between the amplifying radiation return systems 212 and 214 and this is also penetrated by the laser-active medium 216 and an amplifying radiation field 222 can be generated within it, this field being generated, for example, as illustrated in FIG. 13, in the area close to an optical axis 224 of the resonator 210.

Furthermore, an acousto-optical modulator 30 is also provided in the resonator 210.

The acousto-optical modulator 30 and the amplifying radiation return system 212 form a modulation device which corresponds to the fifth embodiment of the inventive modulation device described above with respect to the interaction of the acousto-optical modulator 30 and the amplifying radiation return system but without the polarizers used in the fifth embodiment being necessary.

An amplifying radiation field 240, which comes from the second amplifying radiation return system 214 comprising, in the simplest case, a reflector with as high a degree of reflection as possible and propagates in a direction 242 approximately parallel to the optical axis 224 towards the first amplifying radiation return system 212 and is incident in the acousto-optical modulator 30, corresponds to the incident radiation field 40 described above and after entering the acousto-optical modulator 30 is divided into a transmitted branch 40T propagating along the beam axis 42 as well as a diffracted branch 40B which is diffracted by an angle of diffraction α in relation to the beam axis 42 and propagates with the beam axis 44 in a direction of diffraction of the first order, the two branches propagating within the acousto-optical modulator 30 further towards the first amplifying radiation return system 212 (FIG. 13) which is identical to the radiation guide system 26''' with respect to construction and function.

With respect to the generation of the first radiation field 46 and the second radiation field 48 reference can thus be made in full to the explanations concerning the fifth and first embodiments of the modulation device.

If the phases of the radiation fields are considered, in addition, this results in ratios analogous to those of an anti-resonant ring interferometer, which is described in the article of E. Siegman in IEEE Journal of Quantum Electronics, February 1973, pages 247 to 250, in the case of a diffraction efficiency of 50% between the respectively transmitted branch 40T and the diffracted branch 40B of the first order, these ratios leading to the fact that the "reflectivity" can be 100%, i.e. that the branches 40TZT and 40BZB forming the second radiation field 48 can cancel one another out due to destructive interference whereas the branches 40BZT and 40TZB forming the returning first radiation field 46 can comprise essentially the entire intensity of the incident radiation field 40 due to constructive interference.

If, on the other hand, no grating 38 is present in the acousto-optical modulator 30, the entire incident radiation field 40 exits in the form of the second radiation field 48, which, in this case, comprises only the branch 40TZT resulting due to reflection, in the direction of diffraction of the first order 44 since no diffraction whatsoever occurs.

In all the intermediate states of the diffraction efficiency between 0% and 50% the intensity of the incident radiation field 40 is divided between the different branches and thus between the returning first radiation field 46 and the second radiation field 48 which is coupled out. An analogous division into different branches is also obtained at a diffraction efficiency between 100% and 50%.

In a first variation of the first embodiment of the laser amplifying system, illustrated in FIG. 14, the first amplifying radiation return system 212' is constructed similar to the radiation return system 26" of the third embodiment (FIG. 5) of the inventive modulation device and comprises, instead of two mirrors, two lenses 260 and 262 as well as a reflection mirror 264, wherein the lenses 260 and 262 image the transmitted branch 40T and the diffracted branch 40B onto the reflection mirror 264 such that the returned diffracted branch 40BZ and the returned transmitted branch 40TZ enter the acousto-optical modulator 30 again in the same alignment as in the first embodiment of the laser amplifying system as a result of reflection at the reflection mirror 264 and imaging of the lenses 262 and 260.

To guide out the radiation field 48 coupled out, comprising the branches 40TZT and 40BZB, an additional lens 266 and a reflection mirror 268 are provided which, in the end, sees to it that the radiation field 48 coupled out extends transversely to the optical axis 224.

The remaining components of the first variation of the first embodiment, illustrated in FIG. 14, are provided with the same reference numerals and so with respect to the description thereof reference is made in full to the explanations concerning the first embodiment of the laser amplifying system.

In a second variation of the first embodiment of the laser amplifying system, illustrated in FIG. 15, the first radiation return system 212" comprises a lens 270 which images the transmitted branch 40T and the diffracted branch 40B, which exit from the acousto-optical modulator 30 at the angle α in relation to one another, into, for example, two branches 272 and 274 which extend parallel to one another and are then reciprocally passed over into one another by means of a mirror system designated altogether as 276, wherein the laser-active medium 216a' and 216b' is arranged within the optical path of the mirror system.

This embodiment shows that the laser-active medium can be arranged at any optional location in the amplifying radiation field.

The second radiation return system 214 is designed as a simple reflector, wherein a lens 278 is also associated with it, this lens causing the branches 40TZB and 40BZT to impinge on the return system 214 with an approximately parallel course in relation to the branches 40TZT and 40BZB whereas the branches 40TZT and 40BZB exit as radiation field 48 coupled out.

Figure 16:
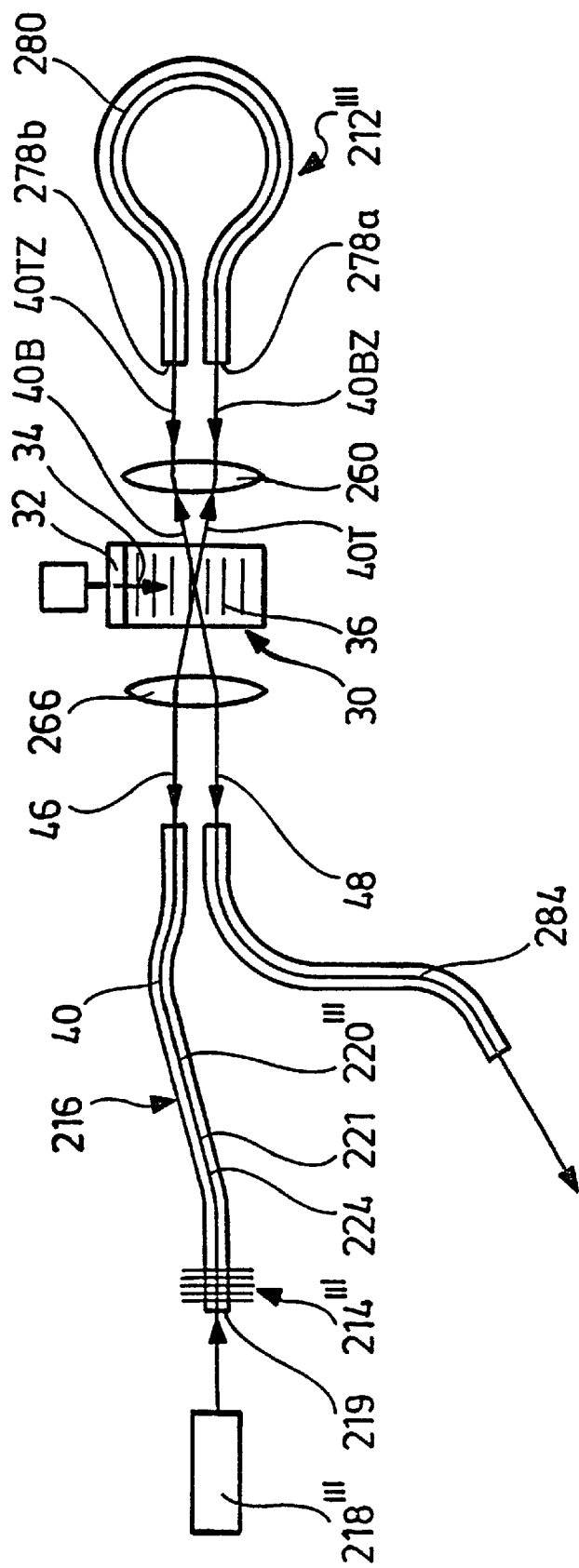
FIG. 16 shows a schematic illustration of a third variation of the first embodiment of the inventive laser amplifying system.

In a third variation of the first embodiment of the laser amplifying system, illustrated in FIG. 16, the laser-active medium 220''' is formed by way of the doping of an optical fiber 221 which is pumped, for example, by pumping laser radiation of a pumping light source 218''' coupled to one end and leads to the formation of the radiation field 40 which propagates along the optical axis 224 of the fiber 221. In this respect, the second radiation return system 214''' is designed, for example, as a Bragg reflection grating which is arranged near to the end 219 and allows the laser radiation to pass through for the pumping of the laser-active medium 220'''.

The radiation field 40 is coupled into the acousto-optical modulator 30 via a lens corresponding to the lens 266 of the first variation and divided in this modulator into a transmitted branch 40T propagating in an exiting direction and a branch 40B diffracted in the first order which exit from the acousto-optical modulator 30 and are coupled into two ends 278a and 278b of a light guide 280 by a lens corresponding to the lens 260, this light guide returning the transmitted branch 40T and the diffracted branch 40B again in the direction of the acousto-optical modulator 30, namely such that the returned transmitted branch 40TZ enters the acousto-optical modulator 30 parallel to the diffracted branch 40B and the returned diffracted branch 40BZ enters the acousto-optical modulator 30 parallel, preferably congruent to the transmitted branch 40T so that, as explained in conjunction with the preceding variations, the returning first radiation field 46 and the second radiation field 48 exit altogether from the acousto-optical modulator 30, wherein the second radiation field 48 is likewise coupled out, for example, via a light guide, preferably in the form of a glass fiber 284.

Figure 17:
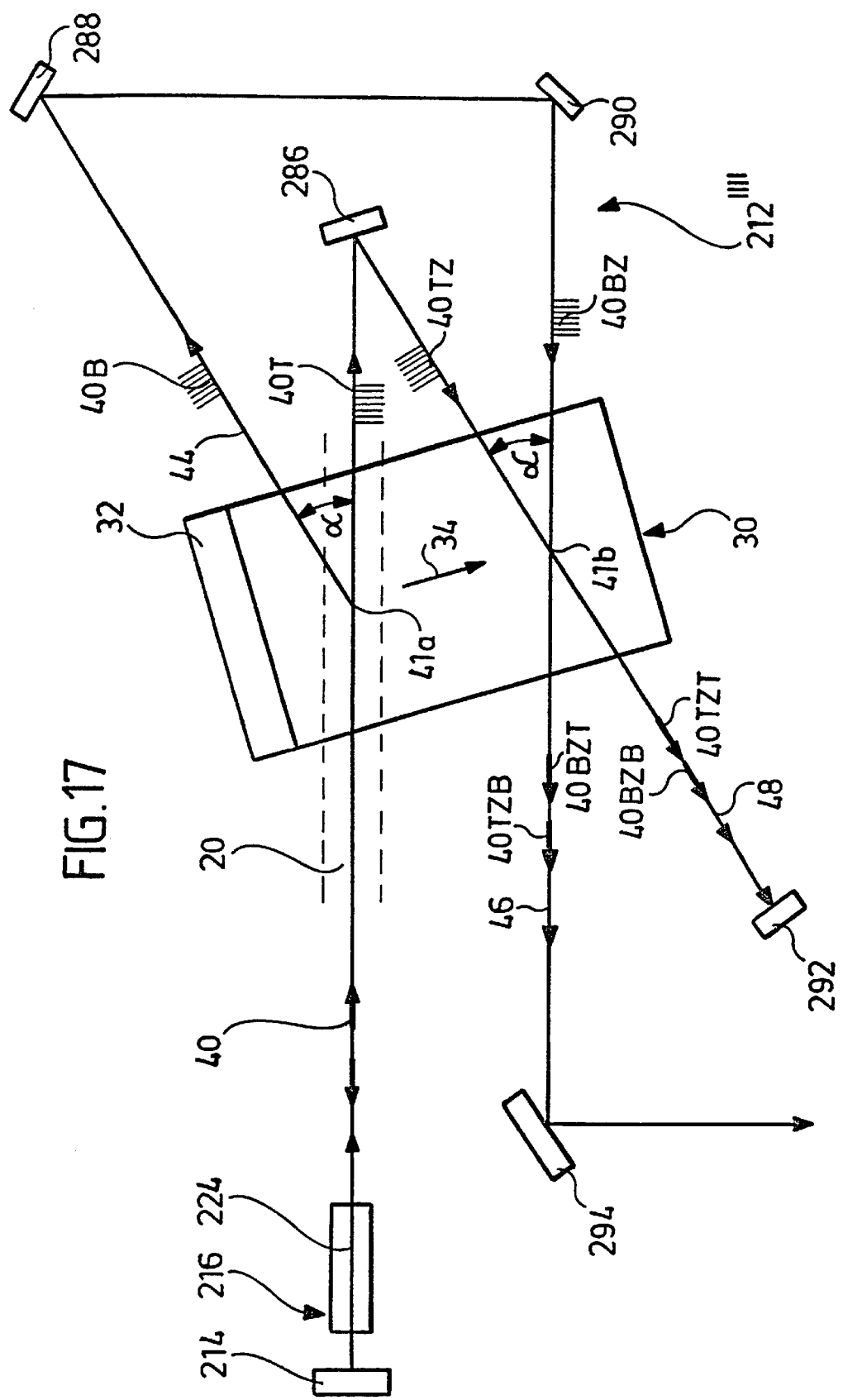
FIG. 17 shows a schematic illustration of a fourth variation of the first embodiment of the inventive laser amplifying system.

A fourth variation of the first embodiment of the laser amplifying system, illustrated in FIG. 17, is constructed similar to the first embodiment of the laser amplifying system with a view to the fundamental construction of the feedback amplifier, wherein the laser-active medium 216 and the second radiation return system 214 are constructed and arranged identically.

In contrast to the first embodiment, the first radiation return system 212"" is, however, designed in the fourth variation of the first embodiment such that it returns the transmitted branch 40T of the incident radiation field 40 to the acousto-optical modulator 30 by means of a first reflector 286 such that this enters the acousto-optical modulator 30 parallel to the diffracted branch 40B but at a distance from it and thus spatially separated as a returned transmitted branch 40TZ. Furthermore, the diffracted branch 40B is deflected by two additional reflectors 288 and 290 such that it enters the acousto-optical modulator 30 as a returned diffracted branch 40BZ extending towards the returned transmitted branch 40TZ at the angle of diffraction α but extends at a distance and parallel to the transmitted branch 40T so that the two intersect in the second junction area 41b in the acousto-optical modulator 30 which is likewise arranged at a distance from the first junction area 41a in the acousto-optical modulator 30 so that the returning first radiation field 46 formed in the acousto-optical modulator 30 from the returned transmitted branch 40TZ and the returned diffracted branch 40BZ exits from the acousto-optical modulator 30 parallel to the incident radiation field 40 but likewise offset at a distance to it and spatially separated from it and the second radiation field 48 likewise exits from the acousto-optical modulator 30 parallel to the diffracted branch 40B and thus offset parallel to the direction of diffraction of the first order 44.

This variation therefore corresponds with respect to its functioning to the fourth embodiment of the inventive modulation device and reference is made to the explanations hereon.

In the fourth variation, an additional reflector 292 is also provided which reflects the second radiation field 48, which exits from the acousto-optical modulator 30, back into itself so that it can be coupled back into the laser-active medium 216 via the reflector 286 as well as the reflectors 288 and 290 of the first amplifying radiation return system 212"".

If the acousto-optical modulator operates with a diffraction efficiency of essentially 0%, no diffraction of the incident radiation field 40 occurs and this is merely reflected by the reflector 286, forms the returned transmitted branch 40TZ and then the second radiation field 48 which merely comprises the branch 40TZT. This second radiation field 48 is reflected back into itself by the reflector 292 and is thus likewise reflected back into the laser-active medium 216 again by the reflector 286 in the opposite direction to the incident radiation field 40 so that at a diffraction efficiency of the acousto-optical modulator 30 of essentially 0% an enclosed resonator with the first radiation return system 214 as one end mirror and the reflector 292 as the other end mirror is present.

Furthermore, it has the power 0 in the first radiation field 46 on account of no diffraction occurring.

If, however, the acousto-optical modulator 30 is operated with a diffraction efficiency of essentially 50%, the first radiation field 46, which comprises essentially the entire power of the incident radiation field 40, results in the acousto-optical modulator 30 on account of the diffraction and transmission of the returned branches 40TZ and 40BZ since the two branches 40BZB and 40TZT are constructively superimposed whereas the second radiation field 48 has no intensity on account of the branches 40BZB and 40TZT canceling one another out, wherein the difference in the path length which the respective branches have from the first acousto-optical modulation as far as the superposition to form the first radiation field and the second radiation field must be adapted for this purpose.

Since the first radiation field 46 exits from the acousto-optical modulator 30 offset parallel to the incident radiation field 40 and spatially separated from it, this may be coupled out in a simple manner with an additional coupling-out mirror 294 and used as a radiation field coupled out, wherein, in this case, the radiation field coupled out has a shift in frequency of $F_o$–F, as already explained in conjunction with the first embodiment of the laser amplifying system and the first embodiment of the modulation device.

This means that in the fourth variation of the first embodiment the radiation field coupled back again to the laser-active medium 216 is the second radiation field 48 which has the frequency $F_o$ and thus, in contrast to the first embodiment, a full feedback exists since the frequencies of the incident radiation field 40 and the radiation field 48 coupled back are identical.

Figure 18:
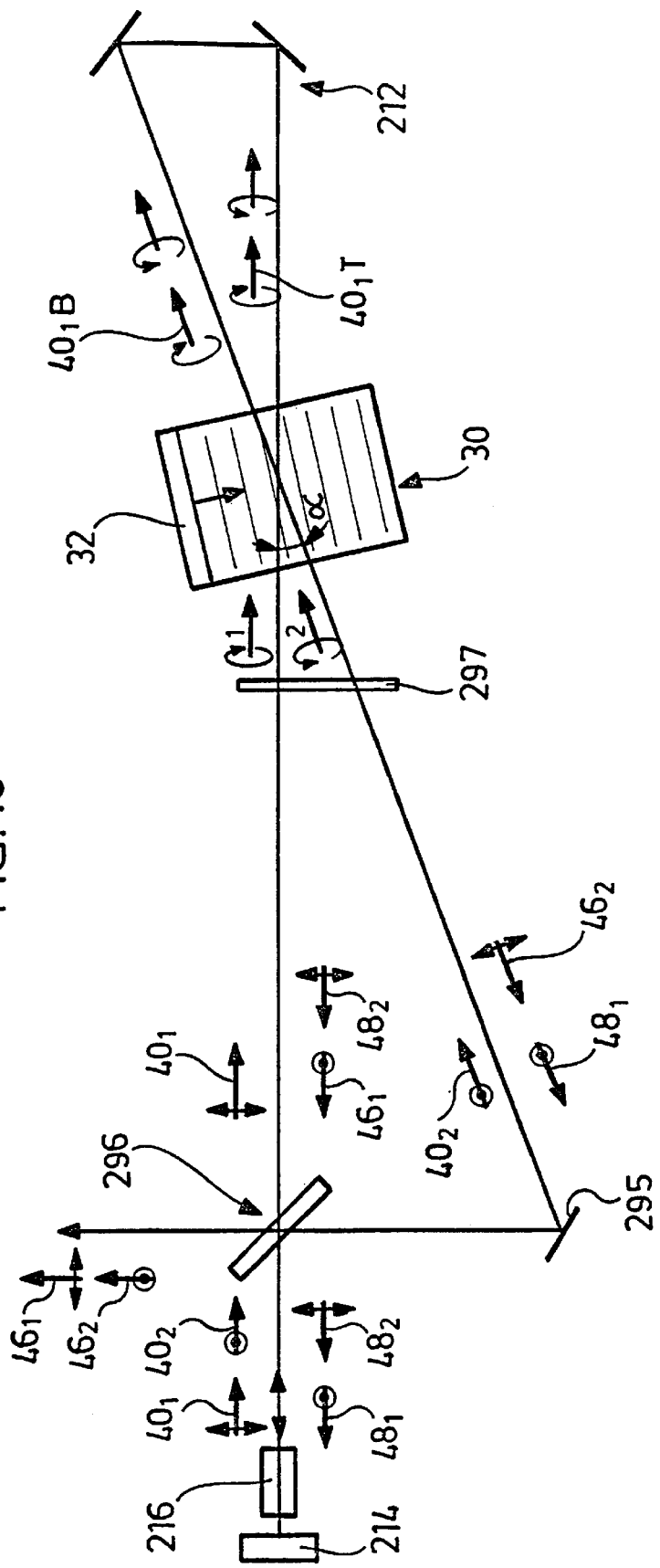
FIG. 18 shows an illustration of a fifth variation of the first embodiment of the inventive laser amplifying system.

In a fifth variation of the first embodiment of the laser amplifying system, illustrated in FIG. 18, a construction is selected in accordance with the first embodiment but with the difference that the second radiation field 48 exiting from the acousto-optical modulator 30 is guided by means of a reflector 295 to a beam-splitting polarizer 296, on which the incident radiation field 40 also impinges.

It is shown with this fifth variation of the first embodiment that additional manifold uses of embodiments of the inventive laser amplifying systems result due to the use of additional polarization-influencing elements, the utilization of polarization-influencing effects of the elements used or, however, a combination of polarization-influencing properties.

If the incident radiation field 40 comprises, for example, two components $40_1$ and $40_2$ polarized at right angles to one another, the beam-splitting polarizer 296 is arranged, for example, such that the component $40_1$ essentially passes through it as more or less completely as possible and propagates in the direction of the acousto-optical modulator 30 whereas the component $40_2$ is essentially deflected by it and as more or less completely as possible.

The first component $40_1$ of the incident radiation field 40 is now, in the same way as that explained in conjunction with the first embodiment of the laser amplifying system for the incident radiation field 40, divided into a first component of the returning first radiation field $46_1$ as well as a first component of the second radiation field $48_1$, wherein the first component of the second radiation field $48_1$ is reflected towards the beam-splitting polarizer 296 by means of the reflector 295.

The second component of the incident radiation field $40_2$ is reflected by the beam-splitting polarizer 296 onto the reflector 295 after exiting from the laser-active medium 216 and thus extends essentially congruent but in an opposite direction to the first component of the second radiation field 481.

This second component of the incident radiation field $40_2$ now enters the acousto-optical modulator 30 at the angle of diffraction of the first order $\alpha$ in relation to the first component of the incident radiation field $40_1$ and experiences, as described in conjunction with the first embodiment, a division into a second component of the returning first radiation field $46_2$, which propagates in the same way as the first component of the second radiation field $48_1$, and a second component of the second radiation field $48_2$ which propagates in the same direction as the first component of the returning first radiation field $46_1$.

If an element or a combination of elements is located in the light path which the radiation fields pass along on the way from the incident radiation field 40 after separation into the components $40_1$ and $40_2$ at the beam-splitting polarizer 296 and before the first radiation field with the components $46_1$ and $46_2$ and the second radiation field with the components $48_1$ and $48_2$ reach the beam-splitting polarizer 296 again, this element or combination effecting a rotation of polarization through $\pm 90°$ of the components $46_1$ and $48_1$, relative to the component $40_1$ as well as of the components $46_2$ and $48_2$ relative to the component $40_2$ the component $48_1$ will pass through the beam-splitting polarizer 296 essentially completely and the component $48_2$ will be deflected at the beam-splitting polarizer 296 essentially completely whereas the component $46_2$ passes through the beam-splitting polarizer 296 essentially completely and the component $46_1$ is deflected at the beam-splitting polarizer 296 essentially completely so that the two components $48_1$ and $48_2$ of the second radiation field extend in a more or less opposite direction to the incident radiation field 40 and are thus coupled back into the laser-active medium.

As a result, the first component of the second radiation field $48_1$ and the second component of the second radiation field $48_2$ are coupled back altogether into the laser-active medium whereas the first component of the returning first radiation field $46_1$ and the second component of the returning first radiation field $46_2$ are coupled out.

However, this is not a feedback of an identical radiation field since the first component of the second radiation field $48_1$ has a polarization which is at right angles to the first component of the incident radiation field $40_1$ and the second component of the second radiation field $48_2$ has a polarization which extends at right angles to the second component of the incident radiation field $40_2$.

In the fifth variation of the first embodiment illustrated in FIG. 18, an element which turns the polarization of the components $40_1$ and $40_2$ of the incident radiation field through $90°$ after they have passed through it twice is used, for example, between the acousto-optical modulator 30, on the one hand, and the polarizer 296 or the reflector 295, on the other hand, so that the second, frequency-identical radiation field formed from a superposition of the two components $48_1$ and $48_2$ is essentially coupled back in a more or less opposite direction to the incident radiation field 40.

In this respect, the rotation of polarization necessary for the feedback of the second radiation field $48_1$ and $48_2$ need not be brought about by the element 297; other solutions are also conceivable, e.g. by using polarization-influencing properties of the acousto-optical modulator 30, by means of additional elements between acousto-optical modulator 30 and first amplifying radiation return system 212, by means of additional elements in the first amplifying radiation return system 212, by using polarization-influencing properties of the components with a suitable construction of the first amplifying radiation return system 212 or a combination of various polarization-influencing properties of elements located in the laser amplifying system.

Further possibilities in the case of the fifth variation of the first embodiment result using the fact that the polarization-influencing properties generally depend on the alignment of the polarization components of the radiation fields in relation to the main axes of the polarization-influencing elements. If the rotation of polarization desired for the feedback of the second radiation field $48_1$ and $48_2$ is achieved, for example, by means of a double refractive element 297 which transfers the linear polarization of the two components $40_1$ and $40_2$ of the incident radiation field into a respective, as far as possible circular polarization at an alignment of the main axes of the double refraction in $45°$ in relation to the direction of polarization of the components $40_1$ and $40_2$ it is possible, in addition, to couple back the first, frequency-shifted radiation field formed from the components $46_1$ and $46_2$ by rotating the element 297 in such a manner that the alignment of the double refraction main axes corresponds to the directions of polarization of the components $40_1$ and $40_2$ so that the polarization of the components of the radiation fields is not altered.

As a result, the fifth variation of the first embodiment permits a switchover between two different modes of operation without any complicated activation and with simple means.

In a first mode of operation of the fifth variation of the first embodiment of the laser amplifying system, illustrated in FIG. 18, a feedback of the incident radiation field 40 into the laser-active medium 216 is brought about when the diffraction efficiency of the acousto-optical modulator 30 is in the range of 0 since the first component of the second radiation field $48_1$ and the second component of the second radiation field $48_2$ each have the maximum intensity whereas at a diffraction efficiency in the range of 50% the first component of the second radiation field $48_1$ and the second component of the second radiation field $48_2$ have more or less no power on account of the effects explained in detail in conjunction with the first embodiment whereas more or less the entire power is led through the first component of the first radiation field $46_1$ and the second component of the first radiation field $46_2$ and in this case coupled out. In the case of the first mode of operation, the directions of polarization of the components $48_1$ and $48_2$ of the second radiation field coupled back as well as the components $46_1$ and $46_2$ of the first radiation field coupled out are turned through 90° in relation to the components $40_1$ and $40_2$ of the incident radiation field and the frequency-shifted radiation field is essentially coupled out and the frequency-identical radiation field coupled back.

In the case of the second mode of operation of the fifth variation of the first embodiment, a maximum feedback of the incident radiation field 40 into the laser-active medium 216 takes place when the diffraction efficiency of the acousto-optical modulator 30 is in the range of 50% since the components $46_1$ and $46_2$ of the first radiation field then have the maximum power each whereas at a diffraction efficiency in the range of 0% the components $46_1$ and $46_2$ of the first radiation field have more or less no power. In the case of the second mode of operation, the directions of polarization of the components $48_1$ and $48_2$ of the second radiation field coupled back as well as the components $46_1$ and $46_2$ of the first radiation field coupled out are not rotated in relation to the components $40_1$ and $40_2$ of the incident radiation field and the frequency-identical radiation field is essentially coupled out as well as the frequency-shifted radiation field coupled back.

Figure 19:
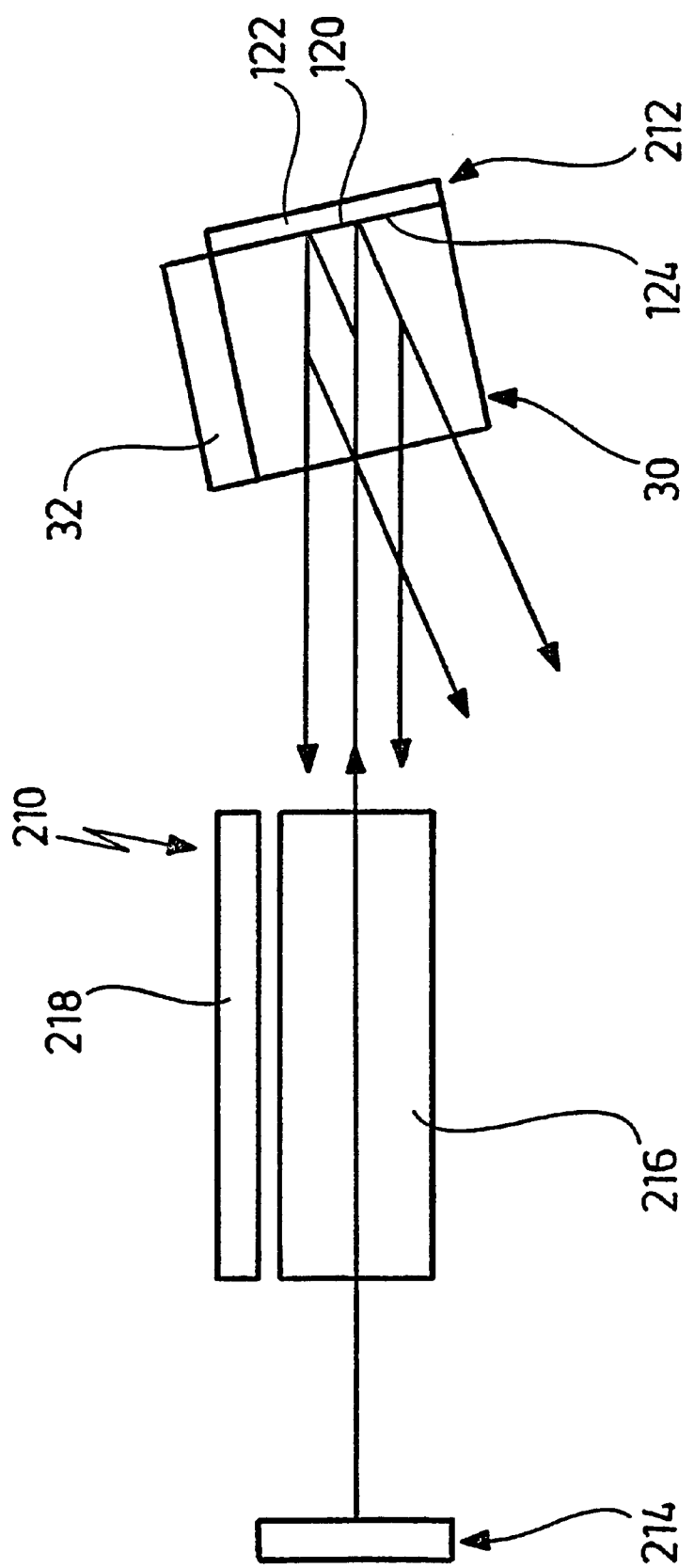
FIG. 19 shows an illustration of a second embodiment of an inventive laser amplifying system.
Figure 20:
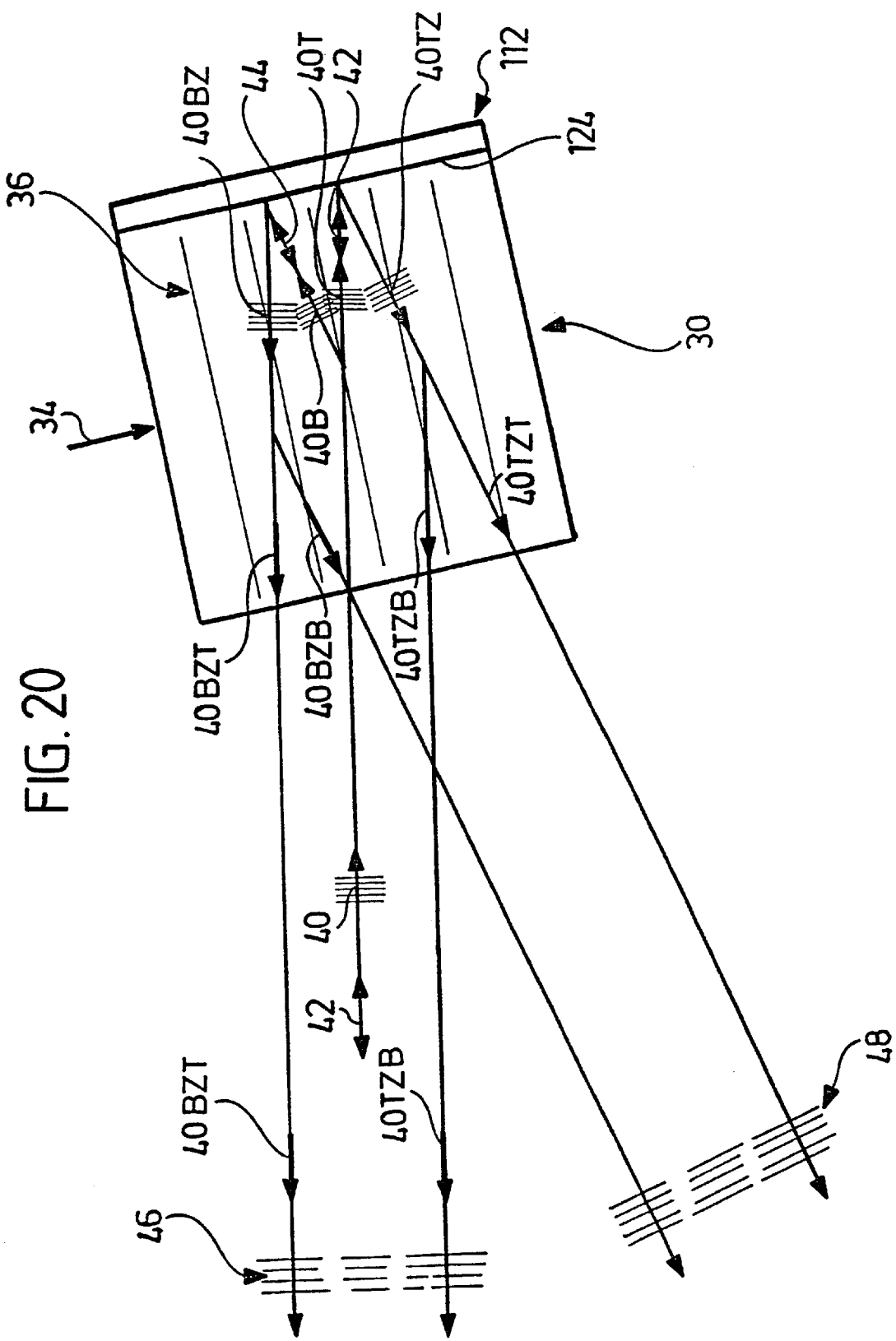
FIG. 20 shows a sectional enlarged illustration in the area of the acousto-optical modulator of the second embodiment of the inventive laser amplifying system.

In a second embodiment of an inventive laser amplifying system, illustrated in FIGS. 19 and 20, a laser resonator 210 is likewise provided which comprises a first radiation return system 212 and a second radiation return system 214 as well as a laser-active medium 216 arranged within the resonator 210. In this respect, the laser-active medium 216 can likewise be pumped by a pumping source 218.

The laser-active medium 216, the pumping source 218 and the second radiation return system 214 are preferably designed in the same way as in the first embodiment of the laser amplifying system.

In addition, an acousto-optical modulator 30 is likewise provided in the resonator 210 and this is designed and operates in the same way as in the first embodiment of the laser amplifying system and as described in conjunction with the eighth embodiment of the inventive modulation device so that reference is made hereto in full.

In contrast to the first embodiment of the laser amplifying system, the first amplifying radiation return system 212 is designed in the simplest case as a reflector which is formed by a reflecting layer 122 arranged on a side surface 120 of the acousto-optical modulator on the exit side for the incident radiation field 40 and has a reflector surface 124 which rests directly on the side surface 120 of the acousto-optical modulator 30 and thus coincides essentially with it.

The two branches 40BZT and 40TZB resulting due to the first and the second acousto-optical modulations result in the returning radiation field 46 propagating in the direction of the second amplifying radiation return system 214 and the two branches 40TZT and 40BZB resulting due to the first and the second acousto-optical modulations result in the second radiation field 48 coupled out in the same way as in the first embodiment, wherein the branches 40TZT and 40BZB as well as 40BZT and 40TZB are, however, offset slightly in relation to one another which is unimportant insofar as the branches still interact with one another so that a complete reflection of the incident radiation field 40 into the radiation field 46, which is reflected back and propagates in the opposite direction thereto in the direction of the second amplifying radiation return system 214, is likewise brought about at a diffraction efficiency of 50%.

Figure 21:
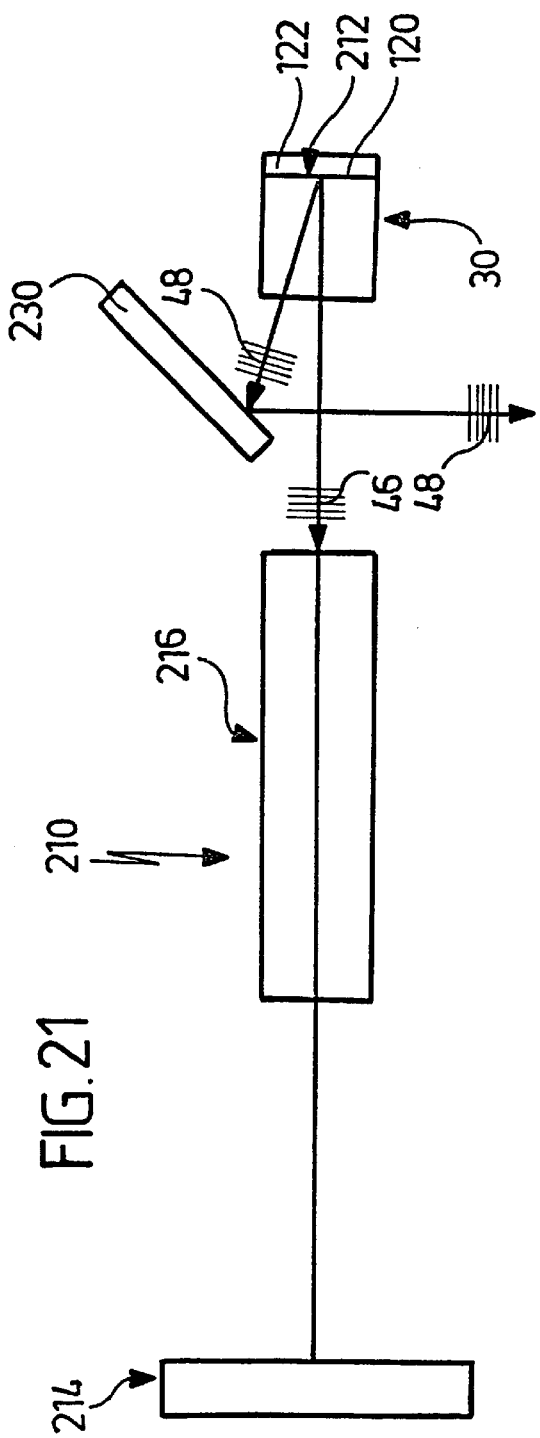
FIG. 21 shows a schematic illustration of a first variation of the second embodiment of the inventive laser amplifying system and FIG. 22 shows a schematic illustration of a second variation of the second embodiment of the inventive laser amplifying system.

In a first variation of the second embodiment of the laser amplifying system, illustrated in FIG. 21, those elements which are identical to those of the second embodiment of the laser amplifying system have been given the same reference numerals and so reference can be made in full to the comments on the second embodiment with respect to their description.

In contrast to the second embodiment, an additional reflector 230 is provided for the radiation field 48 coupled out and this reflects the radiation field such that it propagates transversely to the radiation field 46 reflected back.

As for the rest, reference can be made in full to the comments on the second embodiment.

Figure 22:
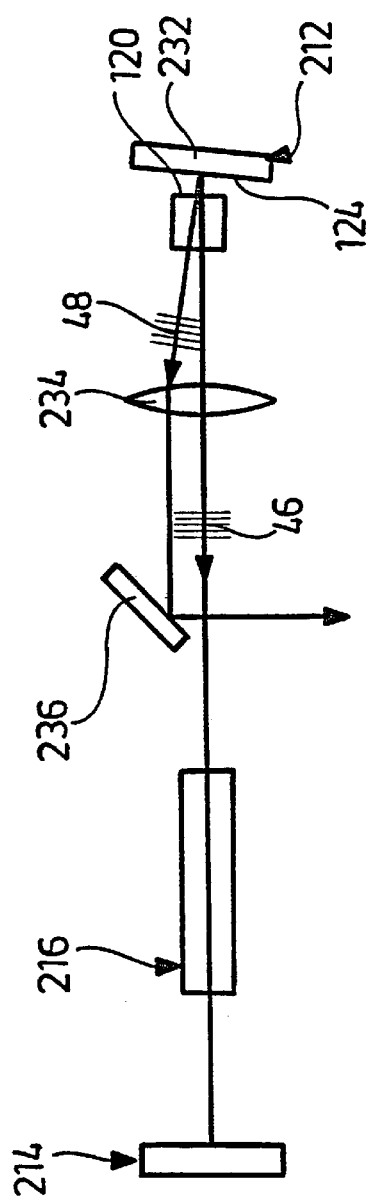

In a second variation of the second embodiment of the laser amplifying system, illustrated in FIG. 22, the first amplifying radiation return system 212 is designed as a separate mirror 232 which is arranged at a distance from the side surface 120 of the acousto-optical modulator 30 but reflects the transmitted branch 40T and the diffracted branch 40B in the manner explained in conjunction with the second embodiment in FIG. 18, wherein the transverse offsetting between them is even greater than in the second embodiment of the laser amplifying system described and illustrated in FIGS. 18 and 19.

As for the rest, a lens 234 is provided, in addition, which guides the radiation field 48 coupled out parallel to the radiation field 46 reflected back for such a time until the radiation field coupled out impinges on a reflector 236 which deflects this transversely to the radiation field 46 reflected back.

As for the rest, those elements which are identical to those of the second embodiment of the laser amplifying system are given the same reference numerals and so reference can be made in full to the comments on the second embodiment.

All the modes of operation known thus far can likewise be realized with the inventive embodiments of a laser amplifying system, with the great advantage that a degree of coupling out of approximately 0 to 100% can already be achieved when a diffraction efficiency of approximately 50% of the acousto-optical modulator 30 is reached and when the acoustic power is switched off a degree of coupling out of approximately 100% or 0 and so all the known modes of operation such as mode locking, quality switching, time-dependent modulation of the division and thus the coupling out and cavity dumping can be carried out with a greater efficiency.

What is claimed is:

1. An optical modulation device for coupling an entering optical radiation field to at least one of a first and second exiting optical radiation field, comprising:
   a first acousto-optical modulator having an acousto-optically active medium,
   a first sound wave field travelling through the acousto-optically active medium in a sound propagation direction,
   said first acousto-optical modulator, via a first acousto-optical modulation, dividing a radiation field incident in an entry direction and coupled to the entering radiation field essentially into (i) a transmitted branch propagating in a direction of a beam axis of the incident radiation field and (ii) a diffracted branch extending with a beam axis at an angle of diffraction of the first order in relation to the beam axis of the transmitted branch, wherein an angle bisector between the beam axis of the incident radiation field and the beam axis of the diffracted branch extends approximately parallel to the first sound propagation direction of the sound wave field,
   an optical radiation guide system for deflecting the diffracted and transmitted branches such that with their beam axes extending approximately at an angle of diffraction of the first order relative to one another these branches interact with a travelling second sound wave field having approximately the same frequency as the first sound wave field and providing a second acousto-optical modulation,
   said second acousto optical modulation providing:
      a first further diffracted branch and a first further transmitted branch from the deflected, diffracted branch, and
      a second further diffracted branch and a second further transmitted branch from the deflected, transmitted branch,
   a direction of propagation of (i) the second sound wave field, (ii) the deflected, diffracted branch and (iii) the deflected, transmitted branch being aligned relative to each other such that:
      (a) the first further transmitted branch and the second further diffracted branch propagate in approximately the same direction, are at least partially superimposed and thereby have essentially the same frequency, the at least partially superimposed branches forming a first radiation field as a result of essentially constructive interference, said first radiation field being coupled to the first exiting radiation field, and
      (b) the second further transmitted branch and the first further diffracted branch propagate in approximately the same direction, are at least partially superimposed and thereby have essentially the same frequency, these at least partially superimposed branches forming a second radiation field as a result of essentially destructive interference, said second radiation field being coupled to the second exiting radiation field.

2. A modulation device as defined in claim 1, wherein branches forming the first radiation field are superimposed in essential parts.

3. A modulation device as defined in claim 1, wherein branches forming the second radiation field are superimposed in essential parts.

4. A modulation device as defined in claim 1, wherein the first and the second sound wave fields are generated with a single sound frequency generator.

5. Modulation device as defined in claim 4, wherein the first and the second sound wave fields have amplitudes of essentially the same size.

6. A modulation device as defined an claim 1, wherein the first acousto-optical modulation and the second acousto-optical modulation take place in separate acousto-optical modulators.

7. A modulation device as defined in claim 1, wherein the first acousto-optical modulation and the second acousto-optical modulation take place in the same acousto-optical modulator.

8. Modulation device as defined in claim 7, wherein the first acousto-optical modulation and the second acousto-optical modulation take place in the same acousto-optical modulator essentially separated spatially.

9. Modulation device as defined in claim 7, wherein the first acousto-optical modulation and the second acousto-optical modulation take place essentially in the same volume area of the acousto-optical modulator.

10. A modulation device as defined in claim 1, wherein:
   a beam axis of the incident radiation field and a beam axis of the diffracted branch resulting during the first acousto-optical modulation as well as a beam axis of the transmitted branch define a first plane of modulation approximately parallel to the first sound propagation direction, and
   during the second acousto-optical modulation the beam axes of the diffracted and transmitted branches resulting from the diffracted branch and the transmitted branch define a second plane of modulation approximately parallel to the second sound propagation direction.

11. Modulation device as defined in claim 10, wherein the first and the second planes of modulation are located in a common plane.

12. Modulation device as defined in claim 10, wherein the first and the second planes of modulation are arranged so as to be offset parallel to one another.

13. Modulation device as defined in claim 10, wherein the first plane of modulation and the second plane of modulation extend at an angle to one another.

14. Modulation device as defined in claim 13, wherein the first plane of modulation and the second plane of modulation intersect and have a line of intersection extending essentially parallel to the sound propagation direction of the sound wave field.

15. Modulation device as defined in claim 10, wherein the radiation guide system diverts the diffracted branch resulting during the first acousto-optical modulation and the transmitted branch from the first plane of modulation into the second plane of modulation.

16. A modulation device as defined in claim 1, wherein the radiation guide system is designed as a radiation return system returning the diffracted branch resulting during the first acousto-optical modulation and the transmitted branch to the same acousto-optical modulator.

17. Modulation device as defined in claim 16, wherein the diffracted branch runs to the second acousto-optical modulation approximately parallel to the transmitted branch resulting during the first acousto-optical modulation.

18. Modulation device as defined in claim 16, wherein the transmitted branch runs to the second acousto-optical modulation approximately parallel to the diffracted branch resulting during the first acousto-optical modulation.

19. A modulation device as defined in claim 1, wherein the radiation guide system is designed such that an optical path between the first acousto-optical modulation and the second acousto-optical modulation is approximately of the same size for the diffracted branch and the transmitted branch.

20. A modulation device as defined in claim 1, wherein the radiation guide system aligns the deflected branches such that they extend towards one another in the acousto-optical modulator.

21. Modulation device as defined in claim 20, wherein the radiation guide system causes the deflected branches to run into the acousto-optical modulator such that they intersect one another at least partially approximately in a junction area.

22. A modulation device as defined in claim 1, wherein the radiation guide system has at least two beam deflections causing the branches running apart from one another at the angle of diffraction following the first acousto-optical modulation to run towards one another at the angle of diffraction to the second acousto-optical modulation as deflected branches.

23. Modulation device as defined in claim 22, wherein the beam deflections are formed by reflecting surfaces.

24. A modulation device as defined in claim 1, wherein the radiation guide system returns the deflected branches as branches running apart from one another in the acousto-optical modulator at the angle of diffraction.

25. Modulation device as defined in claim 24, wherein the radiation guide system has a single reflector.

26. Modulation device as defined in claim 25, wherein the reflector is aligned such that a branch impinging on it is reflected back at an angle of return reflection corresponding approximately to the angle of diffraction between the transmitted branch and the diffracted branch.

27. Modulation device as defined in claim 25, wherein the reflector has a flat reflector surface.

28. Modulation device as defined in claim 25, wherein the acousto-optical modulator bears the reflector on a side surface on the exit side for the radiation field incident in it.

29. Modulation device as defined in claim 28, wherein the reflector is designed as a reflector layer applied to the side surface of the acousto-optical modulator.

30. A modulation device as defined in claim 1, wherein the radiation guide system and the acousto-optical modulator interact such that the first radiation field and the second radiation field propagate in directions having a directional component extending in the opposite direction to the direction of propagation of the incident radiation field.

31. A modulation device as defined in claim 30, wherein:
the first radiation field exiting from the acousto-optical modulator on a side located opposite the radiation guide system extends approximately parallel to the incident radiation field, and
the second radiation field extends at an angle of diffraction of the first order in relation to the first radiation field.

32. A modulation device as defined in claim 1, wherein two separate incident radiation fields with directions of polarization at right angles to one another can be generated from the entering radiation field.

33. Modulation device as defined in claim 32, wherein the polarized radiation fields resulting from the incident radiation field experience a rotation of polarization through altogether 90° until the exiting radiation field is formed.

34. A modulation device as defined in claim 33, wherein the rotation of polarization is achieved such that the respective incident radiation field experiences a rotation of polarization through 45° in a polarization-influencing element and the first radiation field exiting from the acousto-optical modulator experiences a further rotation through 45° as a result of the same polarization-influencing element.

35. Modulation device as defined in claim 33, wherein polarization-influencing elements are provided for turning the direction of polarization of the incident radiation field through 90° and leaving unaffected the direction of polarization of the first radiation field passing through them.

36. A modulation device as defined in claim 1, wherein:
an optical diode is provided, the incident radiation field impinging on said diode, and
said diode couples the returning first radiation field into one of the exiting radiation fields.

37. A modulation device as defined in claim 1, wherein the first acousto-optical modulation is operable with a diffraction efficiency within a range reaching from approximately 0% to approximately 50%.

38. A modulation device as defined in claim 1, wherein the second acousto-optical modulation is operable with a diffraction efficiency within a range reaching from approximately 0% to approximately 50%.

39. A modulation device as defined in claim 1, wherein the modulation device is arranged in an amplifying radiation field.

40. A modulation device as defined in claim 1, wherein the modulation device has an amplifying radiation field of a laser amplifying system passing through it.

41. A modulation device as defined in claim 1, wherein the modulation device is part of a feedback laser amplifying system.

42. Modulation device as defined in claim 41, wherein the radiation guide system is an amplifying radiation return system.

43. A modulation device as defined in claim 1, wherein the modulation device is incorporated into a laser amplifying system comprising:
a feedback optical amplifier with a plurality of amplifying radiation return systems,
an optically active volume area extending between the amplifying radiation return systems and passing through a laser-active medium,
an amplifying radiation field being formed within said volume area,
an acousto-optical modulator having the amplifying radiation field passing through it, and
acoustic wave fronts propagating in said modulator in a sound propagation direction and generating a grating, an incident amplifying radiation field being divisible by means of said grating into a respective transmitted branch and a respective diffracted branch extending at an angle of diffraction of the first order in relation to the transmitted branch,
the radiation guide system of said modulation device forming a first one of said amplifying radiation return systems and its incident radiation field being the amplifying radiation field.

44. A modulation device as defined in claim 43, wherein one of the exiting radiation fields is adapted to be coupled back into the optical amplifier.

45. A modulation device as defined in claim 44, wherein the other one of the exiting radiation fields is adapted to be coupled out of the laser amplifying system.

46. A laser amplifying system comprising:
a feedback optical amplifier with a plurality of amplifying radiation return systems;
an optically active volume area extending between the amplifying radiation return systems and passing through a laser-active medium, an amplifying radiation field being formed within said volume area;

an acousto-optical modulator having the amplifying radiation field passing therethrough;

acoustic wave fronts propagating in said modulator in a sound propagation direction and generating a grating;

an incident amplifying radiation field being divisible by means of said grating into (i) a respective transmitted branch and (ii) a respective diffracted branch extending at an angle of diffraction of the first order in relation to the transmitted branch;

a first one of the amplifying radiation return systems returning the branches incident in the first amplifying radiation return system and propagating in the acousto-optical modulator along their beam axes to the acousto-optical modulator in such a manner that an angle between them corresponds approximately to the angle of diffraction of the first order;

the first amplifying radiation return system being arranged to return to the acousto-optical modulator (i) the transmitted branch formed in the acousto-optical modulator during the first acousto-optical modulation and (ii) the corresponding diffracted branch, such that:

(a) the returned transmitted branch forms approximately the same angle with the sound propagation direction as the diffracted branch formed during the first acousto-optical modulation, and (b) the returned diffracted branch forms approximately the same angle with the sound propagation direction as the transmitted branch formed during the first acousto-optical modulation;

the returned transmitted branch and the returned diffracted branch extending in the acousto-optical modulator such that the transmitted and diffracted branches respectively resulting from the returned transmitted branch and the returned diffracted branch are superimposed to form a first radiation field and a second radiation field.

47. Laser amplifying system as defined in claim 8, wherein the returned transmitted branch and the returned diffracted branch are located in a second plane of modulation approximately parallel to the sound propagation direction.

48. Laser amplifying system as defined in claim 47, wherein the transmitted branch and the diffracted branch are located in a first plane of modulation approximately parallel to the sound propagation direction.

49. Laser amplifying system as defined in claim 47, wherein the first plane of modulation and the second plane of modulation extend approximately parallel to one another.

50. Laser amplifying system as defined in claim 8, wherein the returned transmitted branch extends approximately parallel to the diffracted branch formed during the first acousto-optical modulation and the returned diffracted branch extends approximately parallel to the transmitted branch formed during the first acousto-optical modulation.

51. Laser amplifying system as defined in claim 8, wherein the first radiation field is returned to the laser-active medium.

52. Laser amplifying system as defined in claim 51, wherein the first radiation field is returned to the laser-active medium by means of optical elements guiding the incident radiation field to the acousto-optical modulator.

53. Laser amplifying system as defined in claim 46, wherein the second radiation field is returned to the laser-active medium.

54. Laser amplifying system as defined in claim 53, wherein the second radiation field is returned to the laser-active medium by being returned to the acousto-optical modulator and via this as well as the first amplifying radiation return system.

55. Laser amplifying system as defined in claim 54, wherein the second radiation field is returned to the laser-active medium due to reflection back into itself.

56. Laser amplifying system as defined in claim 46 wherein:

the first or the second radiation field forms the radiation field returned to the laser-active medium, and the respectively other radiation field forms the radiation field coupled out.

57. Laser amplifying system as defined in claim 46, wherein the first radiation return system comprises a light guide.

58. Laser amplifying system as defined in claim 46, wherein the first amplifying radiation return system has at least two beam deflections causing the branches running apart from one another at the angle of diffraction to run towards one another again at the angle of diffraction as returned branches.

59. Laser amplifying system as defined in claim 58, wherein the beam deflections are designed as reflecting surfaces.

60. Laser amplifying system as defined in claim 57, wherein the beam deflections comprise lenses and reflectors.

61. Laser amplifying system as defined in claim 46, wherein the first amplifying radiation return system aligns the returned branches such that they extend towards one another in the acousto-optical modulator.

62. Laser amplifying system as defined in claim 61, wherein the first amplifying radiation return system causes the returned branches to run into the acousto-optical modulator such that they intersect one another at least partially approximately in the junction area.

63. Laser amplifying system as defined in claim 46, wherein the first amplifying radiation return system returns the returned branches as branches running apart from one another in the acousto-optical modulator at the angle of diffraction.

64. Laser amplifying system as defined in claim 63, wherein the first amplifying radiation return system has a single reflector.

65. Laser amplifying system as defined in claim 64, wherein the reflector is aligned such that a branch impinging on it is reflected back at an angle of return reflection corresponding approximately to the angle of diffraction between the transmitted branch and the diffracted branch.

66. Laser amplifying system as defined in claim 64, wherein the reflector has a flat reflector surface.

67. Laser amplifying system as defined in claim 64, wherein the reflector is arranged separately from the acousto-optical modulator.

68. Laser amplifying system as defined in claim 64, wherein the acousto-optical modulator bears the reflector on a side surface on the exit side for the radiation field incident in it.

\* \* \* \* \*